(12) United States Patent
Dorum et al.

(10) Patent No.: US 9,097,551 B2
(45) Date of Patent: Aug. 4, 2015

(54) METHOD AND APPARATUS FOR PROCESSING LOCATION-BASED IMAGING AND TRACE DATA

(71) Applicant: NAVTEQ B.V., Veldhoven (NL)

(72) Inventors: Ole Henry Dorum, Chicago, IL (US); Narayanan Alwar, Chicago, IL (US)

(73) Assignee: HERE Global B.V., Veldhoven (NL)

( * ) Notice: Subject to any disclaimer, the term of this patent is extended or adjusted under 35 U.S.C. 154(b) by 0 days.

(21) Appl. No.: 13/781,148

(22) Filed: Feb. 28, 2013

(65) Prior Publication Data

US 2014/0244153 A1 Aug. 28, 2014

(51) Int. Cl.
*G01C 21/26* (2006.01)
*G01C 21/36* (2006.01)

(52) U.S. Cl.
CPC .................. *G01C 21/3632* (2013.01)

(58) Field of Classification Search
CPC ............ G01C 21/3632; G06F 17/3087; G06F 17/30855
USPC ............... 701/409, 408, 411, 412, 414, 8, 24, 701/118, 514; 340/988; 348/148, E13.004
See application file for complete search history.

(56) References Cited

U.S. PATENT DOCUMENTS

| 2006/0259827 | A1* | 11/2006 | Sohm et al. | 714/38 |
| 2010/0049407 | A1* | 2/2010 | Hijikata et al. | 701/46 |
| 2012/0095682 | A1 | 4/2012 | Wilson | |
| 2012/0116678 | A1* | 5/2012 | Witmer | 702/5 |
| 2012/0133738 | A1* | 5/2012 | Hoffmeier et al. | 348/46 |
| 2014/0120944 | A1* | 5/2014 | Tarkkala et al. | 455/456.1 |

FOREIGN PATENT DOCUMENTS

EP 2 172 748 A1 4/2010

OTHER PUBLICATIONS

J. Connors, et al., "Analysis of a Spline Based, Obstacle Avoiding Path Planning Algorithm," IEEE Vehicle Technology Conference, IEEE VTC 2007, pp. 2564-2569, < http://users.soe.ucsc.edu/~elkaim/Documents/SplineVTC07.pdf >.
J.C. McCall, et al., "Video-Based Lane Estimation and Tracking for Driver Assistance: Survey, System, and Evaluation," Journal IEEE Transactions on Intelligent Transportation Systems, vol. 7, Issue 1, Mar. 2006, pp. 20-37.
S. Schroedl, et al., "Mining GPS Traces for Map Refinement," Data Mining and Knowledge Discovery, 9, (2004), © 2004 Kluwer Academic Publisher, manufactured in the Netherlands, pp. 59-87.
G. Somasundaram, "Lane Change Detection and Tracking for a Safe-Lane Approach in Real Time Vision Based Navigation Systems," pp. 345-361, Published in 2011, < http://airccj.org/CSCP/vol1/csit1231.pdf >.

* cited by examiner

*Primary Examiner* — Marthe Marc-Coleman
(74) *Attorney, Agent, or Firm* — Ditthavong & Steiner, P.C.

(57) ABSTRACT

An approach is provided to process imaging data associated with location trace data of one or more links of a road. A processing platform may process and/or facilitate a processing of imaging data associated with location trace data of at least one link of a road to determine maneuvering information for at least one vehicle collecting the imaging data, the location trace data, or a combination thereof. Further, the processing platform may determine whether to cause, at least in part, an adjusting of at least a portion of the location trace data based, at least in part, on the maneuvering information.

18 Claims, 16 Drawing Sheets

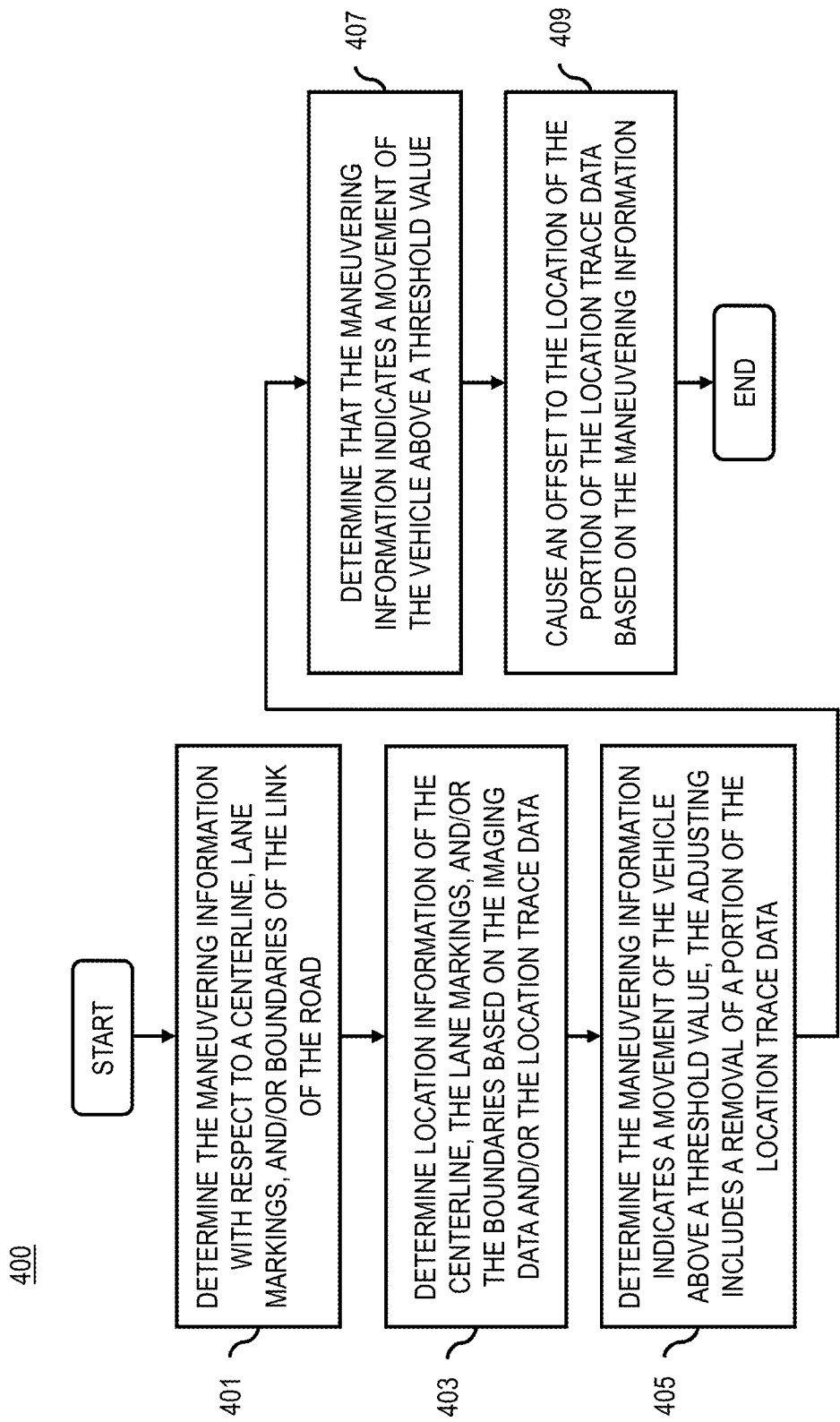

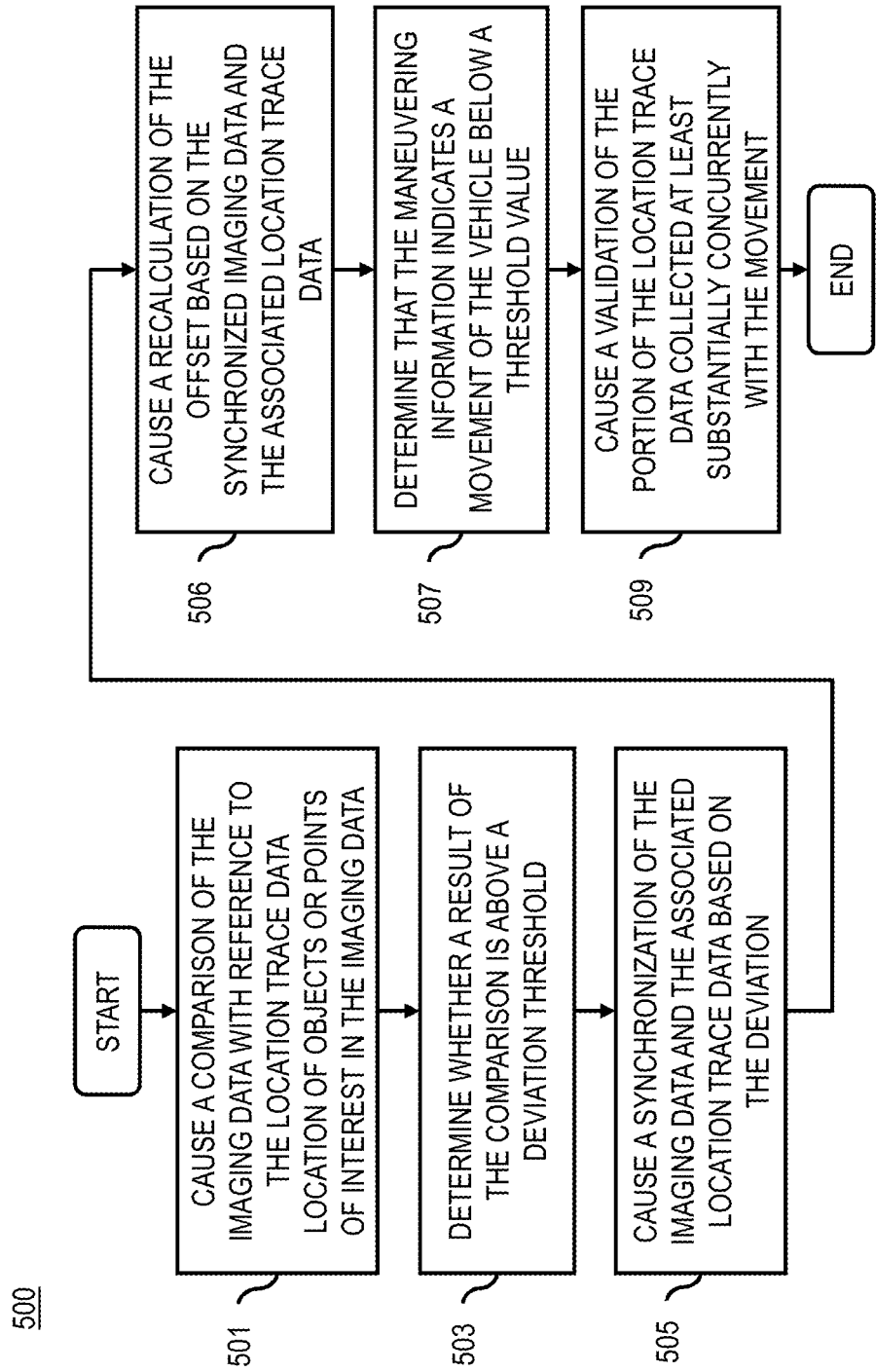

650

670

METHOD AND APPARATUS FOR PROCESSING LOCATION-BASED IMAGING AND TRACE DATA

BACKGROUND

Service providers and device manufacturers (e.g., wireless, cellular, etc.) are continually challenged to deliver value and convenience to consumers by, for example, providing compelling network services. One area of interest has been in collecting and processing geographical location information associated with transportation networks (e.g., roads), which may be used to provide data for use in digital maps and various location-based services utilized by users of various electronic devices (e.g., mobile phones, tablets, navigation devices, in-vehicle systems, etc.) Further, the data may be used in advanced driver assistance systems (ADAS) to improve the comfort, efficiency, safety, and overall satisfaction of a user when traveling in vehicles, for example, by providing information about the road network, road geometry, road conditions, and other items associated with the road and terrain around the vehicle. However, providing the data requires collecting and processing of large volumes of geographical location information, which may be acquired by various mechanisms (e.g., imaging data, positioning data, etc.), various devices (e.g., cameras, global positioning system (GPS) receivers, etc.), various contributors, at various times, and the like. Nevertheless, the collected information need to be accurately and efficiently processed in order to provide useful data for use in maps, navigation systems, ADAS, and the like. Accordingly, service providers and device manufacturers face significant technical challenges in collecting and processing the geographical location information.

SUMMARY OF THE INVENTION

Therefore, there is a need for an approach to accurately and efficiently process imaging data associated with location trace data of one or more links of a road.

According to one embodiment, a method comprises processing and/or facilitating a processing of imaging data associated with location trace data of at least one link of a road to determine maneuvering information for at least one vehicle collecting the imaging data, the location trace data, or a combination thereof. The method also comprises determining whether to cause, at least in part, an adjusting of at least a portion of the location trace data based, at least in part, on the maneuvering information.

According to another embodiment, an apparatus comprises at least one processor, and at least one memory including computer program code for one or more computer programs, the at least one memory and the computer program code configured to, with the at least one processor, cause, at least in part, the apparatus to process and/or facilitate a processing of imaging data associated with location trace data of at least one link of a road to determine maneuvering information for at least one vehicle collecting the imaging data, the location trace data, or a combination thereof. The apparatus is also caused to determine whether to cause, at least in part, an adjusting of at least a portion of the location trace data based, at least in part, on the maneuvering information.

According to another embodiment, a computer-readable storage medium carries one or more sequences of one or more instructions which, when executed by one or more processors, cause, at least in part, an apparatus to process and/or facilitate a processing of imaging data associated with location trace data of at least one link of a road to determine maneuvering information for at least one vehicle collecting the imaging data, the location trace data, or a combination thereof. The apparatus is also caused to determine whether to cause, at least in part, an adjusting of at least a portion of the location trace data based, at least in part, on the maneuvering information.

According to another embodiment, an apparatus comprises means for processing and/or facilitating a processing of imaging data associated with location trace data of at least one link of a road to determine maneuvering information for at least one vehicle collecting the imaging data, the location trace data, or a combination thereof. The apparatus also comprises means for determining whether to cause, at least in part, an adjusting of at least a portion of the location trace data based, at least in part, on the maneuvering information.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of originally filed method claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIGS. 3 through 5 are flowcharts of various processes for, at least, accurately and efficiently processing imaging data associated with location trace data of one or more links of a road, according to various embodiments;

DESCRIPTION OF SOME EMBODIMENTS

Examples of a method, apparatus, and computer program to accurately and efficiently process imaging data associated with location trace data of one or more links of a road are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
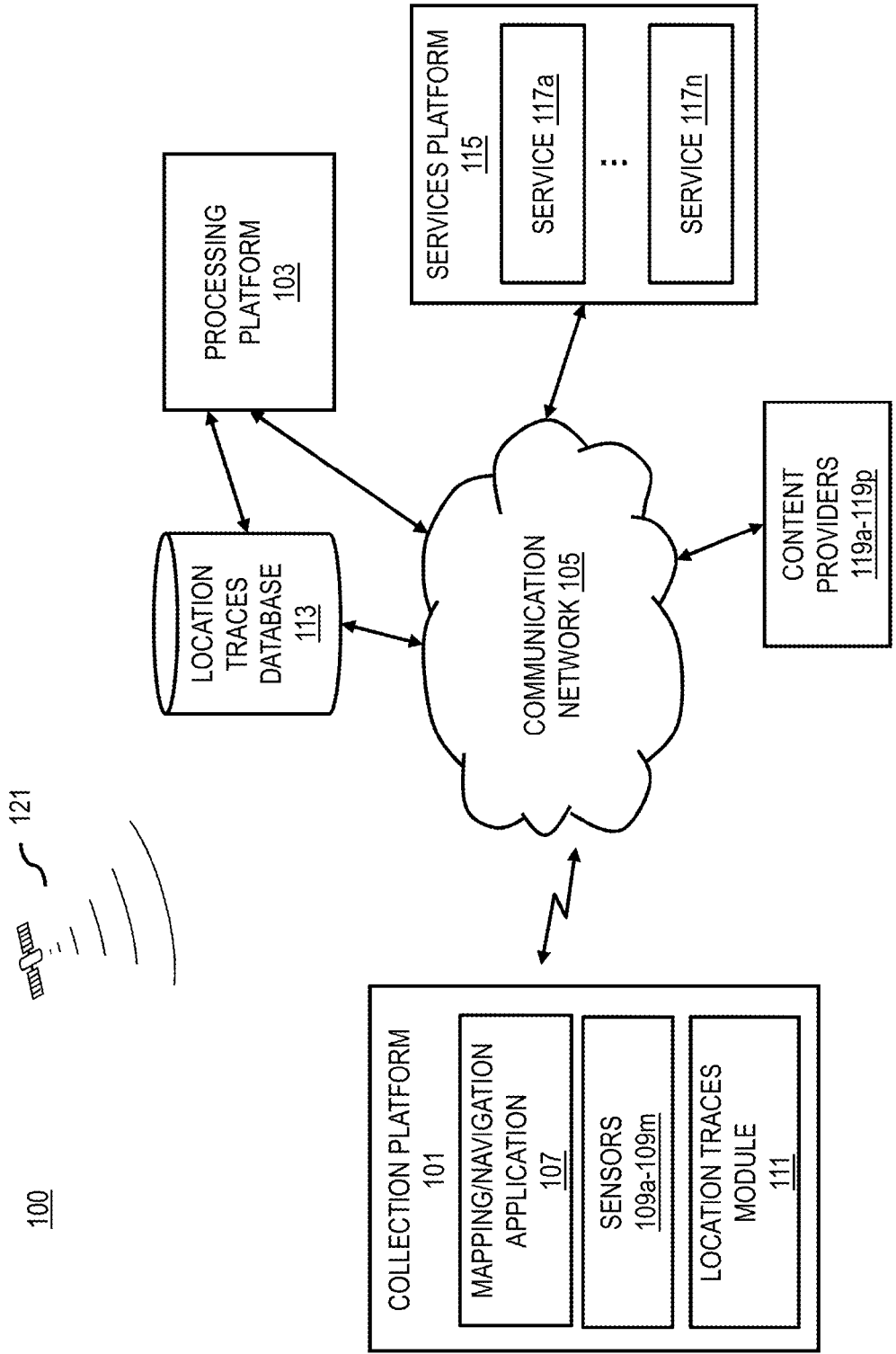
FIG. 1 is a diagram of a system capable of processing imaging data associated with location trace data collected, according to an embodiment.

FIG. 1 is a diagram of a system capable of processing imaging data associated with location trace data of one or more links of a road, according to an embodiment. As previously discussed, one area of interest among service providers and device manufacturers has been accurate and efficient collection and processing of location information of transportation networks so various location-based services, for example navigation assistance, may be provided to users to improve the quality of their travels. Currently, vehicles equipped with various sensors (e.g., GPS, radio frequency identification (RFID), microphones, etc.) and cameras (e.g., video, still, etc.) are utilized to travel on various roads and various locations to collect the imaging data and/or the trace data where the collected data may be processed at the time of collection and/or at a later time. Although the drivers of the vehicles try to maintain a direct path along a given segment of a road, it is possible that they may encounter various traffic conditions, obstacles, detours, road conditions, and the like, which may necessitate the drivers to maneuver around the road conditions. In order to indicate such maneuvers, the drivers may utilize various manual methods to mark/indicate any maneuvers/deviations that may occur during their data collection process. However, as the vehicles may be traveling at various speeds and conditions, the manual markings may not be accurate enough for use in compensating for the deviations, which may affect accuracy of the collected data, wherein such inaccuracies may not be acceptable when used to generate digital maps, determine road geometry, provide ADAS, and the like.

To address this problem, a system 100 of FIG. 1 introduces the capability to accurately and efficiently process imaging data associated with location trace data of one or more links of a road processing imaging data associated with location trace data of one or more links of a road. Currently, a vision based lane departure warning systems (LDWS) may be used in a vehicle to provide real-time alerts based on in-vehicle integrated camera parameters, calibration, and the like. Further, an ADAS batch spline geometry creation process may utilize collected GPS/IMU (inertial measurement unit) drive traces to determine a height dimension whereas a lateral dimension is created from the link geometry. Consequently quality of a resulting two dimensional (2D) road center position, shape, heading, and curvature may directly depend on the quality and density of the link geometry. In various implementations, improved 2D road center spline geometry quality can be obtained by using the collected GPS/IMU drive traces for the 2D dimension of the ADAS B-spline curve fit. However, as discussed, automatic spline fitting to GPS/IMU traces can be challenging since a collection vehicle typically may not necessarily drive in the road center or may exhibit unexpected maneuvers such as ramp exits, turn maneuvers, lane changes, overtaking cars, obstacle avoidances, drive into parking lots etc. Although the field collection procedure suggests/asks for a "mobile plot icon" to be dropped whenever the vehicle makes such maneuvers, it may not be rigorously followed since a driver of the vehicle may be busy with driving/safety tasks. Various mechanisms of the system 100 may be utilized to process imaging data and the associated trace data (GPS data) to detect any maneuvers (e.g., lane changes) that a vehicle may make while it is collecting the imaging data and the associated trace data along one or more links of a road. In one scenario, an automatic method for computing high quality road center geometry using GPS/IMU data must therefore be able to automatically validate normal ("good") sections and identify to remove/adjust for movement ("bad") sections of the trace data caused by such maneuvers.

In various use case scenarios, various image processing technologies, such as in vision based LDWS in the automotive industry such as Mobileye and SafeTrak, may be utilized to monitor the position of a vehicle within a roadway lane and warn a driver if the vehicle deviates or is about to deviate outside the lane boundaries. In one scenario, the LDWS may be a forward looking vision-based system that uses various algorithms to interpret video images to estimate vehicle state (lateral position, lateral velocity, heading, etc.) and roadway alignment (lane width, road curvature, etc.) Additionally, the LDWS algorithms are also capable of computing coordinates for the lane-center/centerline or lane paint boundary marking (e.g., stripes, markers, wireless radio beacons, etc.) that can yield additional improvement in spline shape and curvature. Various embodiments of the system 100 may significantly improve 2D road center spline geometry quality and curvature, which may be obtained by taking advantage of the collected GPS/IMU drive traces for the two-dimensional ADAS spline.

As shown in FIG. 1, the system 100 comprises a collection platform (CP) 101 having connectivity to a processing platform 103 via a communication network 105. The CP 101 may include and/or have access to a mapping/navigation application 107. By way of example, the mapping/navigation application 107 may include, at least in part, a navigation application, a mapping application, a location-based services application, or a combination thereof. Moreover, the CP 101 may include one or more sensors 109a-109m (also collectively referred to as sensors 109). In one example use case, the sensors 109 may include one or more optical sensors (e.g., cameras), audio sensors (e.g., microphones), a GPS receiver, a low power positioning module, a compass, a magnetometer, an accelerometer, etc.

In one embodiment, the CP 101 may also include a location traces module 111 that has substantially similar capabilities as the processing platform 103. In particular, it is contemplated that one embodiment of the present invention disclosed herein may be fully client-based (i.e., the one or more location traces could be pre-processed on the client) if the needed map data is available on a CP 101 in vector format; the one or more location traces are annotated with attributes such as roads, addresses, buildings, etc.; the one or more location traces are compressed for efficient storage, transmission, and look-up, the computation needed (e.g., the computation done by the processing platform 103) can be effectively executed in a CP 101; the index of the one or more location traces corresponding to imaging data (e.g., video, pictures) and/or one or more POIs along one or more links of a road. In one embodiment, location trace data and associated imaging data may be communicated via the communication network 105 to the processing platform 103 for stream processing. In one embodiment, the location trace data and associated imaging data may be communicated via the communication network 105 to the processing platform 103 and/or to one or more other elements of the system 100.

In one embodiment, the processing platform 103 may include or be associated with at least one location traces database 113, which may exist in whole or in part within the processing platform 103 or the location traces module 111. In one example embodiment, the processing platform 103 may exist in whole or in part within the CP 101, or independently. The location traces database 113 may include one or more indexed location traces associated with the CP 101, including at least in part, timestamp information, position information, velocity information, direction information, or a combination thereof. The location traces database 113 may also include one or more service parameters, one or more service suggestions, or a combination thereof associated with the one or more indexed location traces. In one example use case, the one or more service parameters, the one or more service suggestions, or a combination thereof may include one or more points of interest (POIs) associated with an indexed movement history (e.g., driving through a certain area), one or more location-based markers, one or more descriptions of routes traveled, etc. Further, the location traces database 113 also may include mapping data in a vector format (e.g., roads, addresses, building, etc.).

The CP 101 may be also connected to a services platform 115 via the communication network 105. The services platform 115 includes one or more services 117a-117n (also collectively referred to as services 117). The services 117 may include a wide-variety of content provisioning services for the mapping/navigation application 107 (e.g., POIs, related media, etc.) In addition, the CP 101, the services platform 115, and the services 117 are also connected to one or more content providers 119a-119p (also collectively referred to as content providers 119) via the communication network 105. The content providers 119 also may provide a wide variety of content (e.g., maps, POIs information, etc.) to the components of the system 100.

In one embodiment, the processing platform 103, the mapping/navigation application 107, or a combination thereof may utilize location-based technologies (e.g., GPS, cellular triangulation, Assistant GPS (A-GPS), etc.) to determine a movement history of a CP 101. For example, a CP 101 may include a GPS receiver to obtain geographic coordinates from satellites 121 to determine its movement history.

In one embodiment, the system 100 processes and/or facilitates a processing of sensor information associated with the one or more devices to generate one or more location traces, at least a portion of a movement history, or a combination thereof. By way of example, the one or more devices may include a GPS receiver, a low power positioning module, a compass, a magnetometer, an accelerometer, etc. In one example use case, the one or more location traces are always available to the one or more applications even if the one or more location traces were not specifically determined for a particular one of the one or more applications, and the one or more location traces also include a tuple sequence of timestamp, position, velocity, and direction derived from the one or more sensors (e.g., the sensors 109). By way of example, the low power positioning module may be "always-on" and, therefore, constantly populating and updating the location traces database 113, for example, with one or more location traces. More specifically, the one or more location trace data could represent the movement history of a vehicle or a device within available granularity of the sensor and the available data.

In one or more embodiments, the system 100 causes, at least in part, an indexing of the one or more location traces, one or more service parameters, one or more service suggestions, or a combination thereof on the one or more CP 101 devices, a server (e.g., the processing platform 103), or a combination thereof. By way of example, it is contemplated that the system 100 may index a particular location trace (e.g., trace "1") with a corresponding imaging data (e.g., video frame "1"), for example, trace "2" with video frame "2", and so forth. By way of further example, the one or more service parameters may include a preference to return one or more POIs (e.g., landmarks, etc.), at least one description of the one or more routes traveled (e.g., transportation route, planned construction, etc.), etc. that correspond and/or are relevant to the one or more location traces and the imaging data. In one embodiment, the system 100 processes and/or facilitates a processing of the one or more imaging data to determine one or more maneuvering movements of a CP 101 while traveling on a roadway, for example, changing lanes, exiting the roadway, stopping, and the like. In one embodiment, the imaging data is processed along with processing location trace data for comparison and detection of one or more corresponding maneuvers on the roadway by the CP 101. In one embodiment, in a mapping and/or navigation application (e.g., the mapping/navigation application 107), the system 100 can cause, at least in part, a presentation of the one or more location traces, the at least a portion of a movement, or a combination thereof in association with the mapping and/or navigation application.

In one embodiment, the system 100 processes and/or facilitates a processing of imaging data associated with location trace data of at least one link of a road to determine maneuvering information for at least one vehicle collecting the imaging data, the location trace data, or a combination thereof. In one embodiment, the processing platform 103 may utilize one or more algorithms for processing imaging data (e.g., video, pictures, etc.) that may have been captured by one or more cameras and/or other sensors (e.g., microphone, radio frequency identification (RFID), light detection and ranging (LIDAR), barometer, etc.) Further, the processing platform 103 may process the location trace data (e.g., GPS data) associated with the imaging data either concurrently with or separately from the processing of the imaging data. In one example, the imaging data and/or the associated location trace data may be captured via one or more sensors of one or more devices that may be in/on a vehicle, on a user, and the like, which may be stationary near a road or may be traveling along one or more links (segments) of one or more roads. In one embodiment, the processing platform may use an image detection algorithm to detect in the imaging data (e.g., video) a maneuver by the vehicle while the vehicle is capturing the imaging and/or the location trace data. In one embodiment, the maneuvering information indicates, at least in part, a lane departure maneuver, a ramp exit maneuver, an overtaking maneuver, an obstacle avoidance maneuver, a route departure maneuver, or a combination thereof associated with the at least one vehicle while traveling the at least one link of the road. For example, a diver of the vehicle may change his travel lane due to traffic conditions, an obstacle in the travel lane, exiting a road, merging onto another road, and the like. In one embodiment, the processing of the imaging data and/or the location trace data may be performed as a batch process, a streaming process, or a combination thereof. For example, the imaging and/or the location trace data may be retrieved in blocks of data from a data storage and processed via one or more processing platforms. In one example, the imaging and/or the location trace data may be received via one or more data streams from one or more sources (e.g., users, vehicles, etc.), wherein the imaging and/or the location trace data may include one or more portions of pre-processed data.

In one embodiment, the system 100 determines whether to cause, at least in part, an adjusting of at least a portion of the location trace data based, at least in part, on the maneuvering information. In one embodiment, the processing platform 103 may detect that the vehicle collecting the data has made an actual lane change, wherein the processing platform 103 may use one or more algorithms to adjust one or more sections in the location trace data that correspond to the location of the maneuver detected in the imaging data. In one embodiment, the adjustment may include a marking of the one or more sections in the location trace data corresponding to the location of the maneuver. In one embodiment, the adjustment may include an actual adjustment to the one or more sections in the location trace data corresponding to the location of the maneuver, for example, a shifting of GPS coordinates of the one or more sections in the location trace data to indicate the maneuver/movement of the vehicle. In one embodiment, the maneuvering information may indicate a continuous vehicle movement within a lane where the processing platform 103 may perform a continuous adjustment of at least a portion of the location trace data based (e.g., GPS/IMU points) associated with the continuous vehicle movement. In one embodiment, the continuous adjustment may be performed to determine lane center points as long as the maneuvering information is below the threshold value for a removal of the at least a portion of the location trace data.

In one embodiment, the system 100 determines the maneuvering information with respect to a centerline, one or more lane markings, one or more boundaries, or a combination thereof of the at least one link of the road. In one embodiment, the processing platform 103 may compare the maneuvering information with respect to one or more markings (e.g., painted lines, RFID sensors, etc.) on/in the road. For example, a maneuver may indicate that the vehicle is crossing a centerline, one or more lines marking boundaries of a travel lane, and/or the road. In one instance, a centerline may be a center of a travel lane determined from the imaging data and/or the location trace data, or a centerline may be a centerline of the road.

In one embodiment, the system 100 determines location information of the centerline, the one or more lane markings, the one or more boundaries, or a combination thereof based, at least in part, on the imaging data, the location trace data, or a combination thereof. In various embodiments, the processing platform 103 may determine location information of the centerline, the one or more lane markings, and/or the one or more boundaries via processing of the imaging data and/or the location trace data. For example, the imaging data may show that a center line is in the middle of a travel lane, or that lane markings are present on one and/or on both sides of a travel lane, and the like. In one embodiment, the processing platform may use information from the location trace data to determine the location of the centerline, the one or more lane markings, and/or the one or more boundaries with respect to the location of the vehicle (e.g., camera) on the road.

In one embodiment, the system 100 determines that the maneuvering information indicates, at least in part, a movement of the at least one vehicle above a threshold value, wherein the adjusting includes, at least in part, a removal of the at least a portion of the location trace data collected at least substantially concurrently with the movement. In one embodiment, the processing platform 103 may compare the maneuvering information to one or more predefined and/or dynamic threshold values, wherein if the maneuvering information is above the one or more threshold values, then one or more portions of the location trace data corresponding to the location of the maneuver may be removed. In one instance, if a movement of a vehicle is above a threshold value, it is possible that the vehicle is changing its travel lane (e.g., from lane one to lane two), stopping, exiting a road, and the like, then the section of the location trace data (e.g., GPS data) which corresponds to the maneuver location on the road may be removed so, for instance, the location trace data does not show the maneuver on a digital map.

In one embodiment, the system 100 determines that the maneuvering information indicates, at least in part, a movement of the at least one vehicle above a threshold value. In one the processing platform 103 may compare a movement determined from the maneuvering information to one or more predefined and/or dynamic threshold values. For example, a predefined threshold value may be a range or certain change in distance from a current location of the vehicle. In another example, a dynamic threshold value may be determined by the processing platform based on the condition of the road (e.g., under construction, no lane markings, etc.), location of the road (e.g., countryside), and the like. In one instance, the movement information may indicate the vehicle is exiting a road, which may be above a threshold value.

In one embodiment, the system 100 causes, at least in part, an offset to the location of the at least a portion of the location trace data based, at least in part, on the maneuvering information. In one embodiment, the processing platform 103 may introduce an offset into the location trace data based on the maneuvering information so that the maneuver/movement is not indicated in the location trace data. In one embodiment, the offset may be a distance measurement to place a trace at a centerline of a lane, at a lane boundary marking, at the center of the road, etc. For example, if the vehicle, changes travel lanes, stops at the roadside, and then continues traveling, the processing platform can offset the location trace data corresponding to the movements indicated by the maneuvering information so that a maneuver information is not indicated in the location trace information so, for example, a trace on a digital map may show a continuous trace without the maneuver information.

In one embodiment, the system 100 causes, at least in part, a comparison of the imaging data with reference to the location trace data based, at least in part, on location information of one or more objects, one or more points of interest (POIs), or a combination thereof available in the imaging data. In one embodiment, the processing platform 103 may compare the imaging data and the associated location trace data with location of one or more objects and/or POIs detected in the imaging data so, for example, the imaging data and the associated location trace data may be calibrated for continuous accuracy. In one instance, one or more blocks/sections of the location tracing data may not be available and/or may be corrupted, wherein the imaging data may not correctly correlate to the location tracing data any longer, wherein a comparison to location information of a known object/POI along the road may provider a calibration point. For example, the imaging data and the associated location trace data may be compared to location of a certain bridge detected in the imaging data where the location data (e.g., GPS data) of the bridge is known and/or may be determined.

In one embodiment, the system 100 determines whether a result of the comparison is above a deviation threshold value. In one embodiment, the threshold value may be based on a distance, duration of time, and the like. For example, the comparison results may indicate that the imaging data and the location trace data may be out of synchronization, which may be due to one or more errors and/or missing data points in the imaging data and the location trace data.

In one embodiment, the system 100 causes, at least in part, a synchronization of the imaging data and the associated location trace data based, at least in part, on the deviation. In one embodiment, if the deviation value is above the threshold value, then the processing platform 103 may cause a synchronization (e.g., timestamp, travel distance, frame index, etc.) of the imaging data and/or the associated location trace data. For example, location data may be determined from the imaging data, for example based on GPS location of a POI, and then the location trace data may be synchronized with the determined location data.

In one embodiment, the system 100 causes, at least in part, a recalculation of the offset based, at least in part, on the synchronized imaging data and the associated location trace data. In one embodiment, the offset value may be recalculated periodically and/or when there is one or more synchronizations to the imaging data and/or the associated location trace data.

In one embodiment, the system 100 determines that the maneuvering information indicates, at least in part, a movement of the at least one vehicle below a threshold value. In one embodiment, the processing platform 103 may compare the maneuvering information to one or more predefined and/or dynamic threshold values, wherein if the maneuvering information is below the one or more threshold values, then one or more portions of the location trace data corresponding to the location of the maneuver may be validated verified.

In one embodiment, the system 100 causes, at least in part, a validation of the at least a portion of the location trace data collected at least substantially concurrently with the movement. In one embodiment, if a movement of a vehicle is below a threshold value, it is possible that the vehicle is moving within a travel lane (e.g., coming close to a lane marking/boundary), for example to avoid an obstacle in the lane, then the section of the location trace data (e.g., GPS data) which corresponds to the maneuver location on the road may be validated so, for instance, the location trace data does not show the maneuver on a digital map.

By way of example, the communication network 105 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The CP 101 may be any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the CP 101 can support any type of interface to the user (such as "wearable" circuitry, etc.).

By way of example, the CP 101, the processing platform 103, the mapping/navigation application 107, the location traces module 111, the services 117, the content providers 119, and the satellites 121 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
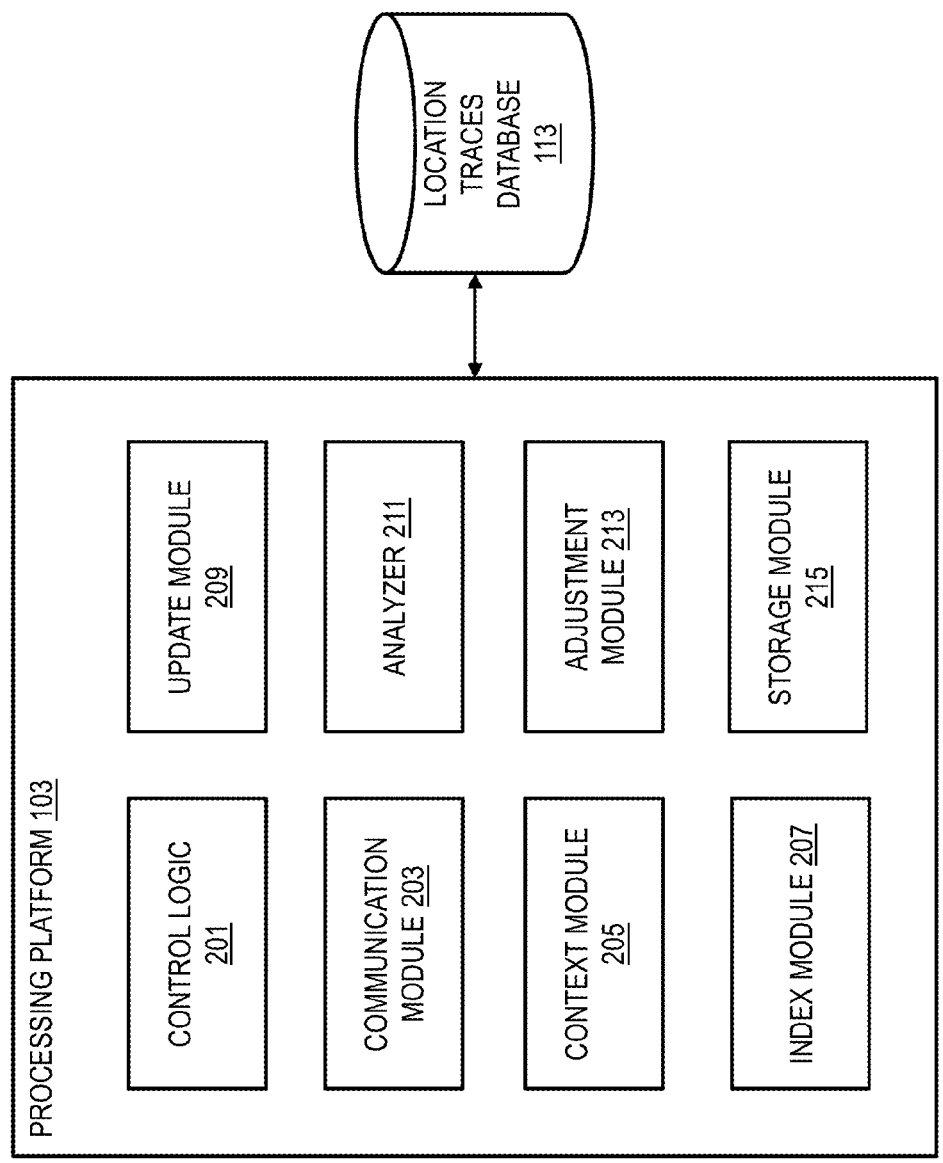
FIG. 2 is a diagram of the components of a imaging and location trace data processing platform, according to an embodiment.

FIG. 2 is a diagram of the components of a imaging and location trace data processing platform, according to an embodiment. Again, while the processing platform 103 and the location traces module 111 may be interchangeable, the various embodiments of the present invention disclosed herein mainly reference the processing platform 103 for the describing some of the functionalities therein. By way of example, the processing platform 103 includes one or more components for processing contemporaneous imaging data and associated location trace data of a CP 101 (e.g., on/in a vehicle) traveling on a roadway where one or more algorithms and methods may be utilized in the processing. Further, the processing platform 103 may determine one or more adjustments (e.g., offsets) for rendering an improved 2D road center spline geometry quality by using the collected GPS/IMU drive traces for the 2D dimension of the ADAS B-spline curve fit. It is contemplated that the functions of these components may be combined in one or more components or performed by other components of equivalent functionality. In this embodiment, the processing platform 103 includes a control logic 201, a communication module 203, a context module 205, an index module 207, an update module 209, an analyzer module 211, an adjustment module 213, and a storage module 215.

The control logic 201 oversees tasks, including tasks performed by the communication module 203, the context module 205, the index module 207, the update module 209, the analyzer module 211, the adjustment module 213, and the storage module 215. For example, although the other modules may perform the actual task, the control logic 201 may determine when and how those tasks are performed or otherwise direct the other modules to perform the task. In one embodiment, the control logic 201 may determine to process the one or more location traces in substantially real-time, batch mode, according to a schedule, or a combination thereof. By way of example, the schedule may be based, at least in part, on computational resources, amount of available data, etc.

The communication module 203 is used for communication between the CP 101, the processing platform 103, the mapping/navigation application 107, the sensors 109, the location traces module 111, the location traces database 113, the service 117, the content providers 119, and the satellites 121. The communication module 203 may also be used to communicate commands, requests, data, etc. The communication module 203 also may be used to determine a request from one or more applications (e.g., receive the request from the mapping/navigation application 107) for location information associated with at least one CP 101. The communication module 203 also may be used to cause, at least in part, a return or transmission of the one or more location traces, imaging data, POIs information, and the like to the one or more applications (e.g., the mapping/navigation application 107).

In one embodiment, the context module 205 processes and/or facilitates a processing of location trace data, which may include at least a portion of a maneuver/movement history. By way of example, the location trace data may include, at least in part, timestamp information, position information, velocity information, direction information, or a combination thereof. In one embodiment, the context module 205 may process the imaging data for determining presence and location of one or more POIs for associating with a corresponding portion of the location trace data.

The index module 207, in certain embodiments, is used to cause, at least in part, an indexing of the imaging data and the associated location trace data, possible maneuvering data, one or more POIs information, or a combination thereof on the CP 101, a server (e.g., the location traces platform 103), or a combination thereof. By way of example, the index module 207 may index or imaging data and the associated location trace data to one or more maneuver instances determined from the imaging data and/or the location trace data. In one embodiment, the update module 209 is used to cause, at least in part, at least one update of the one or more indexed location traces based, at least in part, on the determination of one or more maneuvering movements in the imaging data (e.g., in substantially real-time, periodically, etc.).

In one embodiment, the analyzer module 211 processes and/or facilitates a processing of the imaging data and the associated location trace data to determine maneuvering movements. For example, the analyzer may employ one or more algorithms to process the imaging data (e.g., frame-by-frame of a video recording) to determine a deviation of the CP 101 from a travel path on a roadway. In one embodiment, the analyzer 211 may analyze the imaging data concurrently as processing the associated location trace data for determining one or more adjustments due to any maneuvering information for the location trace data. In one embodiment, the adjustments may be annotated and later processed into the location trace data. The analyzer module 211 may also be used to cause, at least in part, a comparison of the imaging data against the indexed location trace data, and/or the one or more POIs for associating the imaging data at least substantially matching the location trace data and/or the one or more POIs.

In one embodiment, the adjustment module 213 may determine one or more adjustment/offset values for the location trace data based, at least in part, on the results from the analyzer 211, wherein the adjustment values are to offset one or more maneuvers determined from the imaging data and/or the associated location trace data. For example, if the imaging data indicates that a CP 101 maneuvers on a roadway from one travel lane into another, the adjustment may be offset the portion of data in the location trace data so that the maneuvering information is not reflected in the location trace data, where the adjustment may render an undisturbed travel trace on a map application. In one embodiment, the adjustment module 213 may utilize a curve-fitting algorithm for maintaining a continuous travel path along a center-line of a road and/or along a center-line of a lane on the road. For example, it may be desirable to maintain a travel path indicator along the center-line of a middle lane on a roadway regardless which lane on the roadway a CP 101 is traveling.

The storage module 215 is used to manage the storage of the imaging data, the associated location trace data, the one or more POIs information, and/or the indexed location trace data. In addition, the storage module 215 may also be used to manage the storage of mapping data (e.g., roads, addresses, POIs, etc.)

Figure 3:
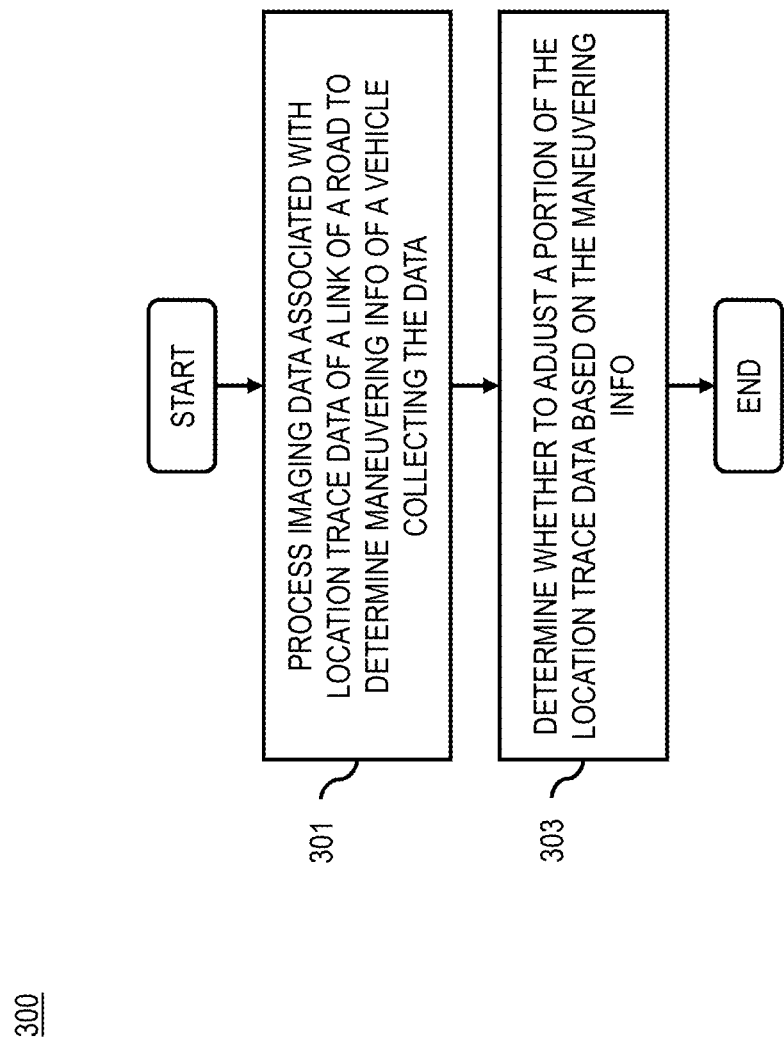

FIGS. 3 through 5 illustrate flowcharts of various processes for, at least, accurately and efficiently processing imaging data associated with location trace data of one or more links of a road, according to various embodiments. In various embodiments, processing platform 103 and/or the collection platform 101 may perform one or more portions of the processes 300, 400, and 500, which may be implemented in, for instance, a chip set including a processor and a memory as shown in FIG. 10. As such, the processing platform 103 and/or the collection platform 101 can provide means for accomplishing various parts of the process 300, 400, and 500 as well as means for accomplishing other processes in conjunction with other components of the system 100. Throughout these processes, the processing platform 103 and/or the collection platform may be referred to as completing various portions of the processes 300, 400, and 500, however, it is understood that other components of the system 100 can perform some of and/or all of the process steps. Further, for clarity in discussing the 300, 400, and 500 processes, the processing platform 103 is referred to as completing various steps of said processes.

In step 301 of the FIG. 3, the processing platform 103 may process and/or facilitates a processing of imaging data associated with location trace data of at least one link of a road to determine maneuvering information for at least one vehicle collecting the imaging data, the location trace data, or a combination thereof. In one embodiment, the processing platform 103 may utilize one or more algorithms for processing imaging data (e.g., video, pictures, etc.) that may have been captured by one or more cameras and/or other sensors (e.g., microphone, radio frequency identification (RFID), light detection and ranging (LIDAR), barometer, etc.) Further, the processing platform 103 may process the location trace data (e.g., GPS data) associated with the imaging data either concurrently with or separately from the processing of the imaging data. In one example, the imaging data and/or the associated location trace data may be captured via one or more sensors of one or more devices that may be in/on a vehicle, on a user, and the like, which may be stationary near a road or may be traveling along one or more links (segments) of one or more roads. In one embodiment, the processing platform may use an image detection algorithm to detect in the imaging data (e.g., video) a maneuver by the vehicle while the vehicle is capturing the imaging and/or the location trace data. In one embodiment, the maneuvering information indicates, at least in part, a lane departure maneuver, a ramp exit maneuver, an overtaking maneuver, an obstacle avoidance maneuver, a route departure maneuver, or a combination thereof associated with the at least one vehicle while traveling the at least one link of the road. For example, a diver of the vehicle may change his travel lane due to traffic conditions, an obstacle in the travel lane, exiting a road, merging onto another road, and the like. In one embodiment, the processing of the imaging data and/or the location trace data may be performed as a batch process, a streaming process, or a combination thereof. For example, the imaging and/or the location trace data may be retrieved in blocks of data from a data storage and processed via one or more processing platforms. In one example, the imaging and/or the location trace data may be received via one or more data streams from one or more sources (e.g., users, vehicles, etc.), wherein the imaging and/or the location trace data may include one or more portions of pre-processed data.

In step 303 of the FIG. 3, the processing platform 103 may determine whether to cause, at least in part, an adjusting of at least a portion of the location trace data based, at least in part, on the maneuvering information. In one embodiment, the processing platform 103 may detect that the vehicle collecting the data has made an actual lane change, wherein the processing platform 103 may use one or more algorithms to adjust one or more sections in the location trace data that correspond to the location of the maneuver detected in the imaging data. In one embodiment, the adjustment may include a marking of the one or more sections in the location trace data corresponding to the location of the maneuver. In one embodiment, the adjustment may include an actual adjustment to the one or more sections in the location trace data corresponding to the location of the maneuver, for example, a shifting of GPS coordinates of the one or more sections in the location trace data to indicate the maneuver/movement of the vehicle. In one embodiment, the maneuvering information may indicate a continuous vehicle movement within a lane where the processing platform 103 may perform a continuous adjustment of at least a portion of the location trace data based (e.g., GPS/IMU points) associated with the continuous vehicle movement. In one embodiment, the continuous adjustment may be performed to determine lane center points as long as the maneuvering information is below the threshold value for a removal of the at least a portion of the location trace data.

In step 401 of the FIG. 4, the processing platform 103 may determine the maneuvering information with respect to a centerline, one or more lane markings, one or more boundaries, or a combination thereof of the at least one link of the road. In one embodiment, the processing platform 103 may compare the maneuvering information with respect to one or more markings (e.g., painted lines, RFID sensors, etc.) on/in the road. For example, a maneuver may indicate that the vehicle is crossing a centerline, one or more lines marking boundaries of a travel lane, and/or the road. In one instance, a centerline may be a center of a travel lane determined from the imaging data and/or the location trace data, or a centerline may be a centerline of the road.

In step 403, the processing platform 103 may determine location information of the centerline, the one or more lane markings, the one or more boundaries, or a combination thereof based, at least in part, on the imaging data, the location trace data, or a combination thereof. In various embodiments, the processing platform 103 may determine location information of the centerline, the one or more lane markings, and/or the one or more boundaries via processing of the imaging data and/or the location trace data. For example, the imaging data may show that a center line is in the middle of a travel lane, or that lane markings are present on one and/or on both sides of a travel lane, and the like. In one embodiment, the processing platform may information from the location trace data to determine the location of the centerline, the one or more lane markings, and/or the one or more boundaries with respect to the location of the vehicle (e.g., camera) on the road.

In step 405, the processing platform 103 may determine that the maneuvering information indicates, at least in part, a movement of the at least one vehicle above a threshold value, wherein the adjusting includes, at least in part, a removal of the at least a portion of the location trace data collected at least substantially concurrently with the movement. In one embodiment, the processing platform 103 may compare the maneuvering information to one or more predefined and/or dynamic threshold values, wherein if the maneuvering information is above the one or more threshold values, then one or more portions of the location trace data corresponding to the location of the maneuver may be removed. In one instance, if a movement of a vehicle is above a threshold value, it is possible that the vehicle is changing its travel lane (e.g., from lane one to lane two), stopping, exiting a road, and the like, then the section of the location trace data (e.g., GPS data) which corresponds to the maneuver location on the road may be removed so, for instance, the location trace data does not show the maneuver on a digital map.

In step 407, the processing platform 103 may determine that the maneuvering information indicates, at least in part, a movement of the at least one vehicle above a threshold value. In one the processing platform 103 may compare a movement determined from the maneuvering information to one or more predefined and/or dynamic threshold values. For example, a predefined threshold value may be a range or certain change in distance from a current location of the vehicle. In another example, a dynamic threshold value may be determined by the processing platform based on the condition of the road (e.g., under construction, no lane markings, etc.), location of the road (e.g., countryside), and the like. In one instance, the movement information may indicate the vehicle is exiting a road, which may be above a threshold value.

In step 409, the processing platform 103 may cause, at least in part, an offset to the location of the at least a portion of the location trace data based, at least in part, on the maneuvering information. In one embodiment, the processing platform 103 may introduce an offset into the location trace data based on the maneuvering information so that the maneuver/movement is not indicated the location trace data. In one embodiment, the offset may be a distance measurement to place a trace at a centerline of a lane, at a lane boundary marking, at the center of the road, etc. For example, if the vehicle, changes travel lanes, stops at the roadside, and then continues traveling, the processing platform can offset the location trace data corresponding to the movements indicated by the maneuvering information so that a maneuver information is not indicated in the location trace information so, for example, a trace on a digital map may show a continuous trace without the maneuver information.

In step 501 of the FIG. 5, the processing platform 103 may cause, at least in part, a comparison of the imaging data with reference to the location trace data based, at least in part, on location information of one or more objects, one or more points of interest (POIs), or a combination thereof available in the imaging data. In one embodiment, the processing platform 103 may compare the imaging data and the associated location trace data with location of one or more objects and/or POIs detected in the imaging data so, for example, the imaging data and the associated location trace data may be calibrated for continuous accuracy. In one instance, one or more blocks/sections of the location tracing data may not be available and/or may be corrupted, wherein the imaging data may not correctly correlate to the location tracing data any longer, wherein a comparison to location information of a known object/POI along the road may provide a calibration point. For example, the imaging data and the associated location trace data may be compared to location of a certain bridge detected in the imaging data where the location data (e.g., GPS data) of the bridge is known and/or may be determined.

In step 503, the processing platform 103 may determine whether a result of the comparison is above a deviation threshold value. In one embodiment, the threshold value may be based on a distance, duration of time, and the like. For example, the comparison results may indicate that the imaging data and the location trace data may be out of synchronization, which may be due to one or more errors and/or missing data points in the imaging data and the location trace data.

In step 505, the processing platform 103 may cause, at least in part, a synchronization of the imaging data and the associated location trace data based, at least in part, on the deviation. In one embodiment, if the deviation value is above the threshold value, then the processing platform 103 may cause a synchronization (e.g., timestamp, travel distance, frame index, etc.) of the imaging data and/or the associated location trace data. For example, location data may be determined from the imaging data, for example based on GPS location of a POI, and then the location trace data may be synchronized with the determined location data.

In step 506, the processing platform 103 may cause, at least in part, a recalculation of the offset based, at least in part, on the synchronized imaging data and the associated location trace data. In one embodiment, the offset value may be recalculated periodically and/or when there is one or more synchronizations to the imaging data and/or the associated location trace data.

In step 507, the processing platform 103 may determine that the maneuvering information indicates, at least in part, a movement of the at least one vehicle below a threshold value. In one embodiment, the processing platform 103 may compare the maneuvering information to one or more predefined and/or dynamic threshold values, wherein if the maneuvering information is below the one or more threshold values, then one or more portions of the location trace data corresponding to the location of the maneuver may be validated verified.

In step 509, the processing platform 103 may cause, at least in part, a validation of the at least a portion of the location trace data collected at least substantially concurrently with the movement. In one embodiment, if a movement of a vehicle is below a threshold value, it is possible that the vehicle is moving within a travel lane (e.g., coming close to a lane marking/boundary), for example to avoid an obstacle in the lane, then the section of the location trace data (e.g., GPS data) which corresponds to the maneuver location on the road may be validated so, for instance, the location trace data does not show the maneuver on a digital map.

FIGS. 6A through 6H illustrate various depictions of the process steps of FIGS. 3 through 5.

Figure 6A:
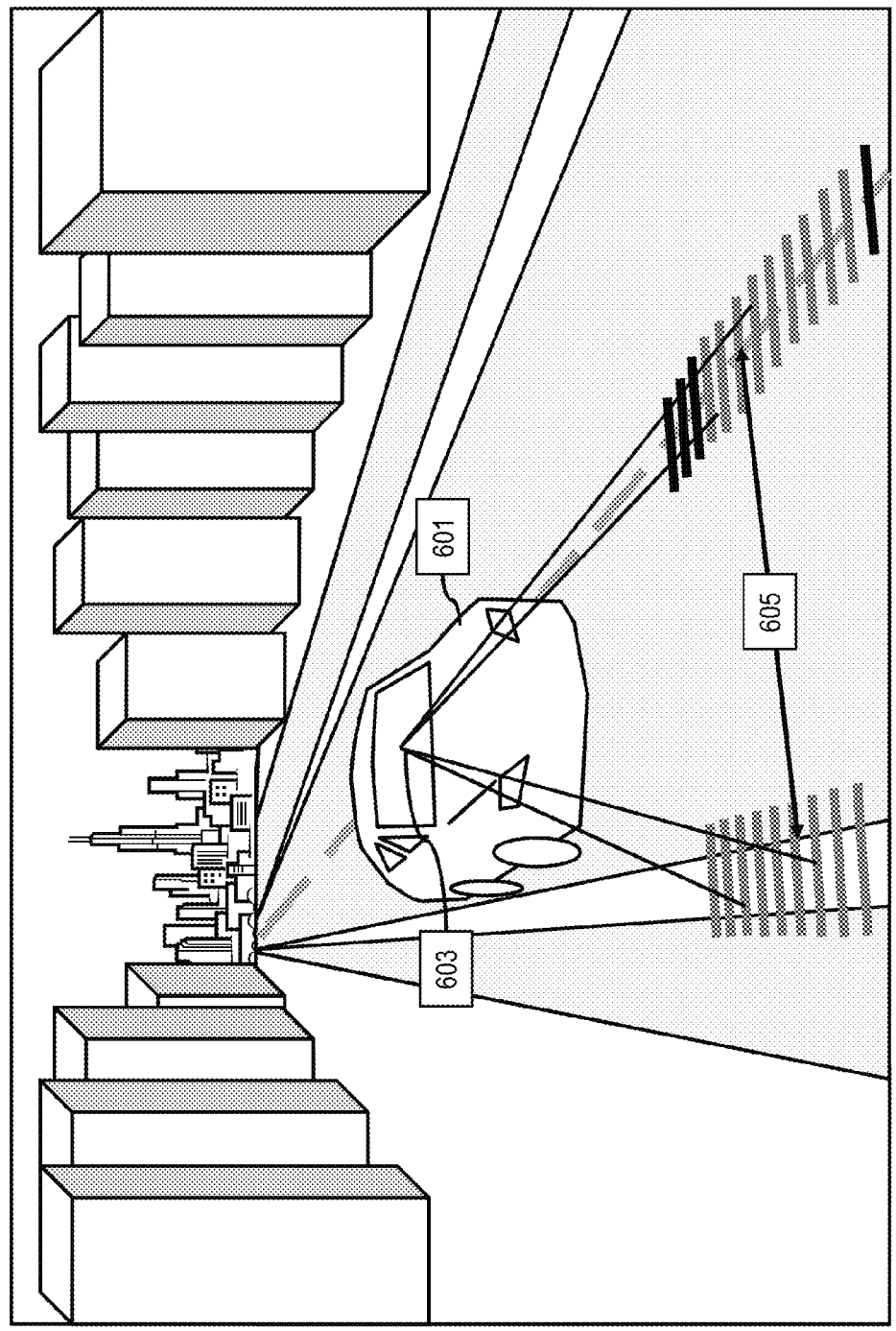
FIGS. 6A through 6H illustrate various depictions of the process steps of FIGS. 3 through 5, according to various embodiments.

FIG. 6A shows diagram 600 which includes a vehicle 601 which may be equipped with one or more sensors 603 for detecting one or more markings 605 on a road, wherein the markings may include one or more painted lines and/or sensors (e.g., RFID) for delineating boundaries of a travel lane on the road. For example, the road may include several lanes where the markings may be different for showing the outer boundaries and the boundaries of the inner lane boundaries. In various embodiments, the sensors 603 may include an LDWS employing one or more cameras, LIDAR transceivers, GPS transceivers, and the like. In one embodiment, the sensors 603 may be coupled to a CP 101 for collecting various imaging data (e.g., video, pictures, etc.) and associated location trace data (e.g., GPS data), which may be processed by the CP 101 and/or by the processing platform 103. In various embodiments, the imaging data and the associated location trace data may be streamed to the processing platform 103 via the communication network 105 and/or stored at a local and/or a remote storage device for future processing.

Figure 6B:
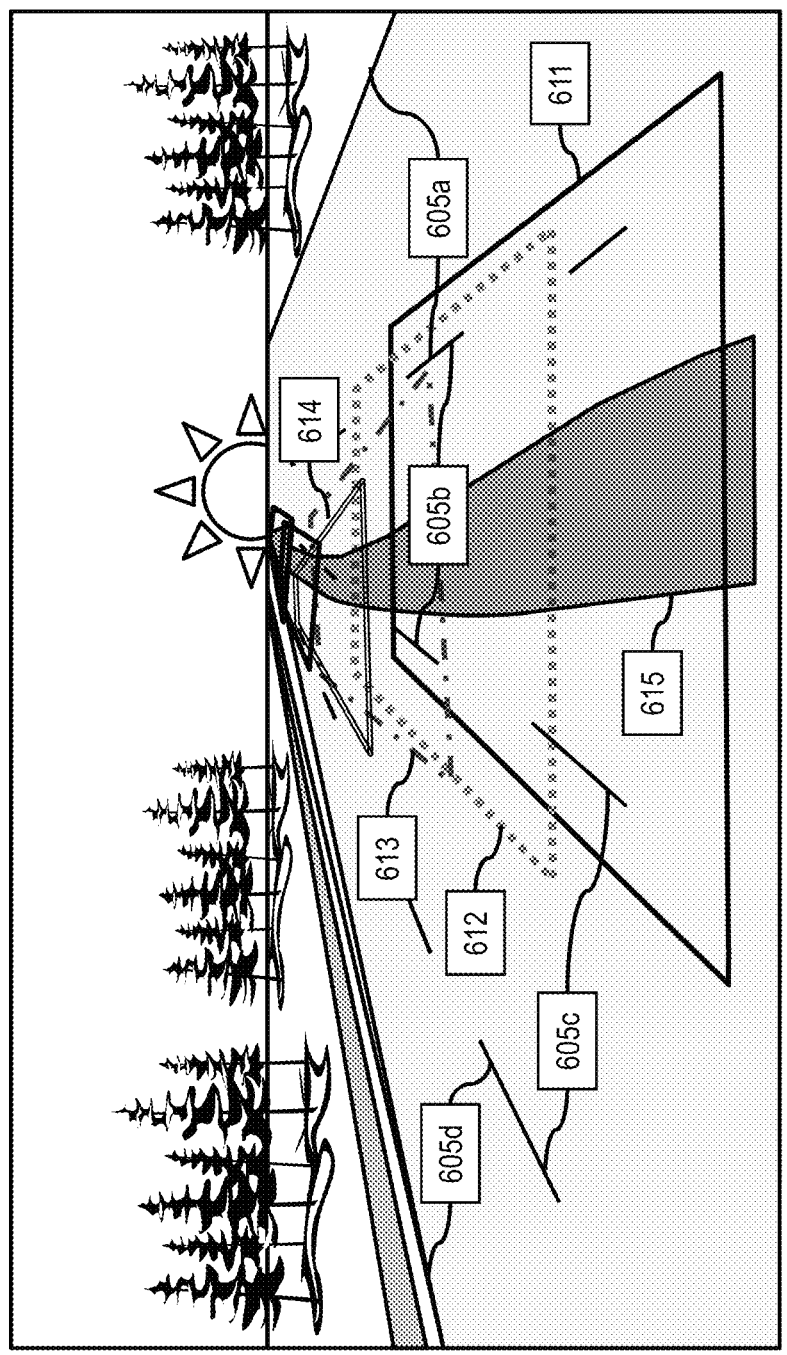

FIG. 6B shows a diagram 610 which include an imaging data of a road including plurality of travel lanes 605*a*-605*d*. In one instance the imaging data may include a plurality of imaging (e.g., video/picture) frames 611, 612, 613, 614, and the like, where the imaging frames may be determined by the processing platform 103 from imaging data captured by the CP 101. In one embodiment, the imaging frames while the vehicle is traveling in one lane may have certain characteristics (e.g., color, outline, etc.) while the characteristics of the frames may change during and after the vehicle transitions from one lane into another lane. In one embodiment, one or more vehicle lane placement image processing technologies may be utilized in batch mode to a database of ADAS GPS/IMU imaging data (e.g., video drives) to produce validated vehicle lane center coordinates to improve the quality of the 2D ADAS spline geometry, heading and curvature.

In one example, the imaging frame 611 indicated that it is substantially centered with the travel lane 605b with a centerline 615 substantially in the center of the travel lane 605b. Further, from the imaging data it can be determined that the vehicle 601 is traveling in the travel lane 605b (e.g., second lane from the right border of the road.) In one example, the imaging frame 612 indicates that the CP 101 is maneuvering to the left and is approaching the lane marking between travel lanes 605b and 605c. In one embodiment, the processing platform 103 and/or the CP 101 may determine a distance from a current location of the CP 101 to the lane markings for determining a current position of the centerline 615. Further, the subsequent imaging frames 613 and 614 indicate that the vehicle continues to maneuver to the left and eventually changes its travel lane from 605b to 605c where the centerline 615 is now in the center of the travel lane 605c. In various embodiments, the imaging frames 611, 612, 613, etc. may be processed at different frame rates for different accuracy levels. For example, processing at faster rates may provide for detection of smaller variations in the maneuvering movements.

Figure 6C:
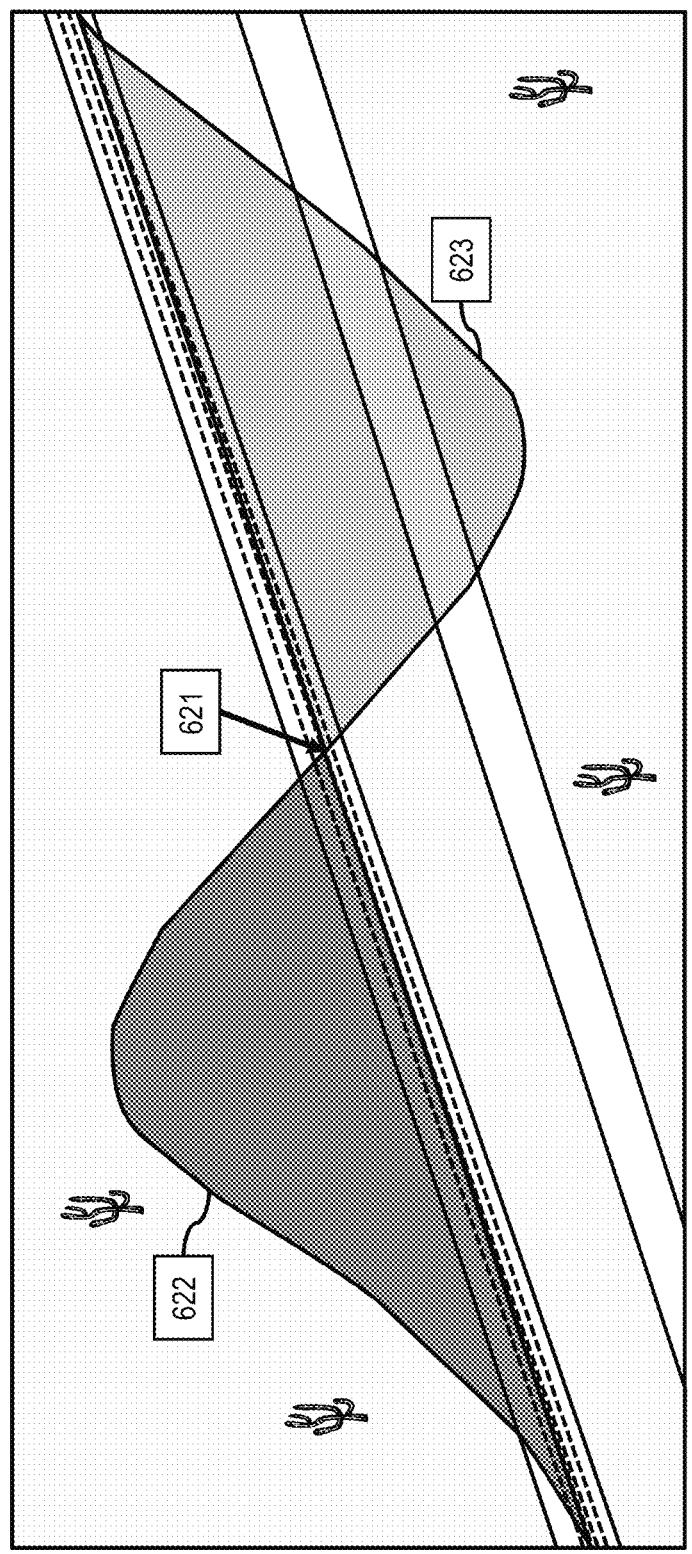

FIG. 6C shows diagram 620 where a travel lane change (e.g., of the FIG. 6A) at 621 may cause an error and/or indeterminate data points in location trace data (e.g., GPS data) that may cause an erroneous rendering on a map application resulting in 622 and 623 curvature spike and heading error in the fitted spline due to the vehicle lane change for the straight road section where the underlying road curvature is zero.

Figure 6D:
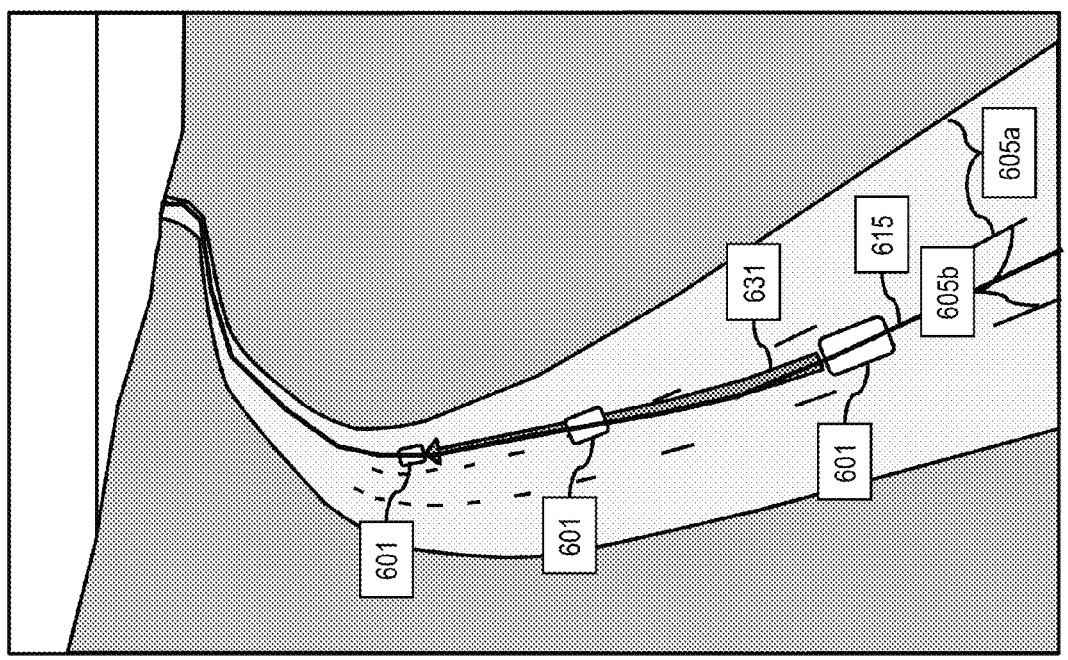
Figure 6E:
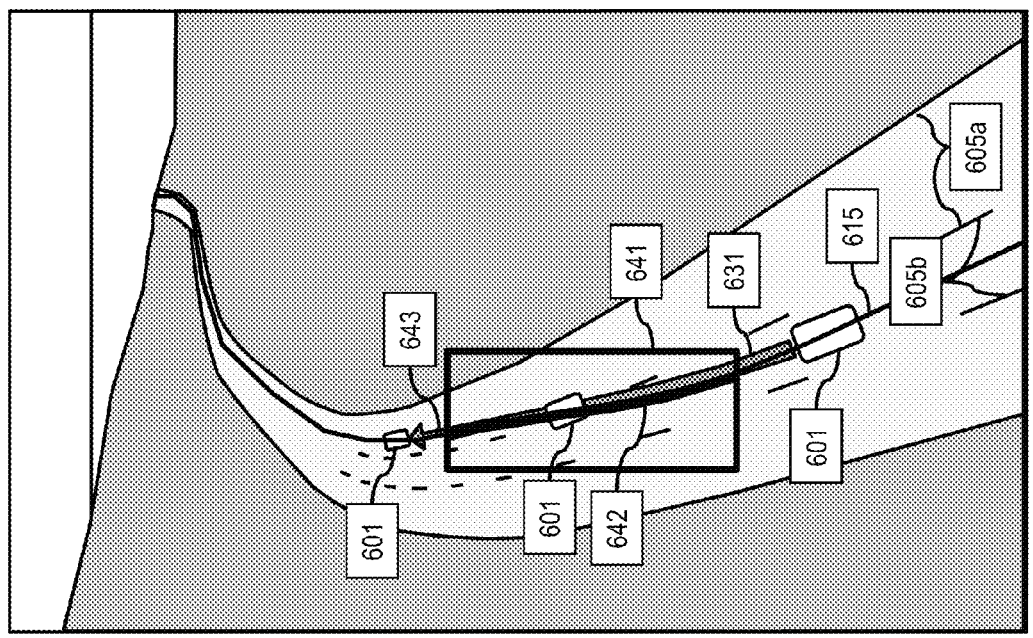

In diagram 630 of the FIG. 6D, the processing platform 103 may detect a change in the travel lane of the vehicle 601 from lane 605b to 605a by processing the imaging data where a change in the center line 615 may be detected at 631 and in diagram 640 of the FIG. 6E, the associated location trace data section 641 and 642 may be processed and marked to indicate the maneuvering and the change in the travel lane between points 631 and 643.

Figure 6F:
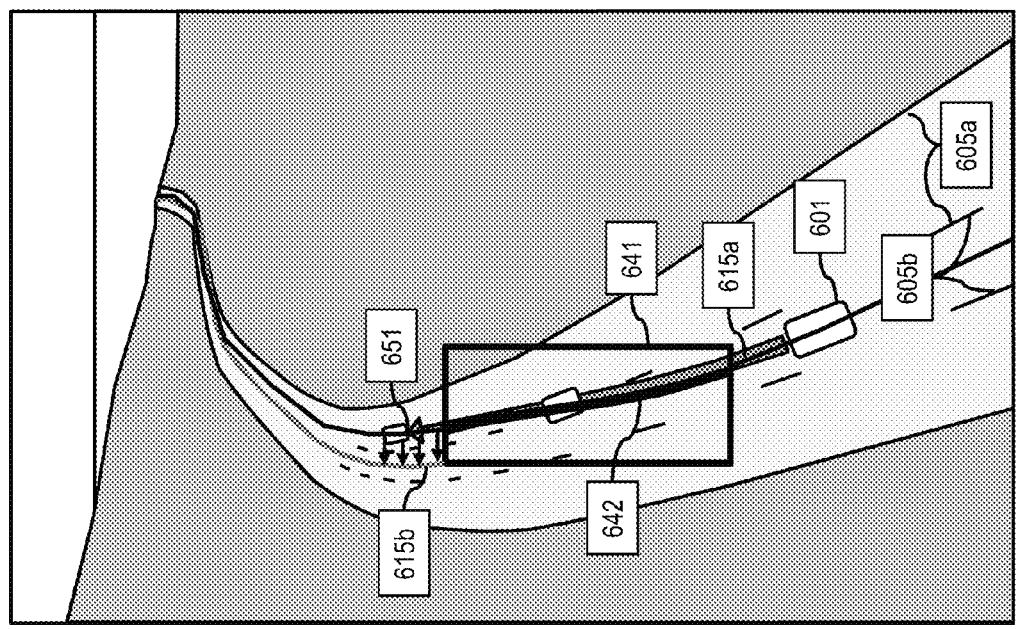

FIG. 6F shows diagram 650 where the processing platform 103 determines a change in the travel lane from lane 605b to 605a within the transition area 641 and between centerline points 615a and 615b. In one embodiment, the processing platform 103 may filter out the lane transition location trace data section 642 (e.g., GPS/IMU data points) as may be identified by the LDWS algorithms. Further, the LDWS algorithm may determine one or more GPS/IMU offset values 651 to offset the section 642 data points so that a virtual centerline 615b substantially continues from point 615a to 615b in centerline of lane 605b (e.g., no segment 642 transition data.) In one example, as the number of lanes on the road may be determined from the navigation system's (ADAS) road attributes, is would be possible to offset and align the location trace data points with the road center (e.g. for roads with even number of lanes or roads where the vehicle did not drive the center lane at all). In one embodiment, a curve fitting algorithm (spline) may curve fit the location trace data consisting of the GPS/IMU data points before the lane transition and the virtual created GPS/IMU points for the centerline 615b after the lane transition. In one embodiment, Calculus of Variations may be used to control the shape of the (spline) curve across the area 641 where there are no constraints. In various scenarios, a curvature preserving regularization term such as the one used in an ADAS process may be utilized to interpolate the lane transition area 641 for accurate resulting curve (spline) shape (i.e. position, heading, and curvature.) In one embodiment, as height dimension (Z) location trace data is typically fitted in a separate step, the GPS/IMU points for lane transitions are retained for the (spline) curve height (Z) fit across lane transitions.

Figure 6G:
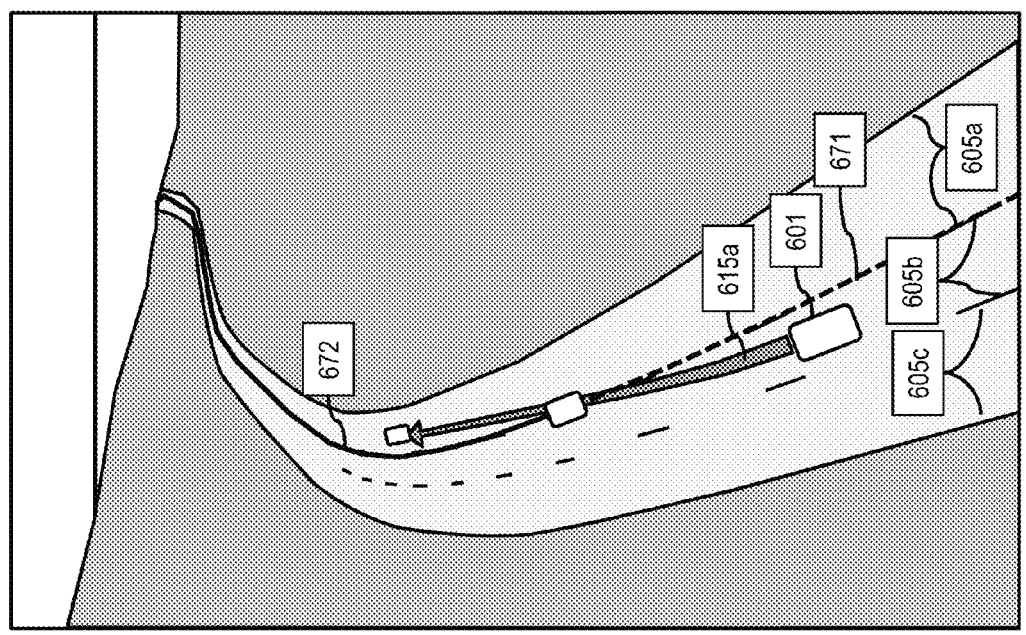
Figure 6H:
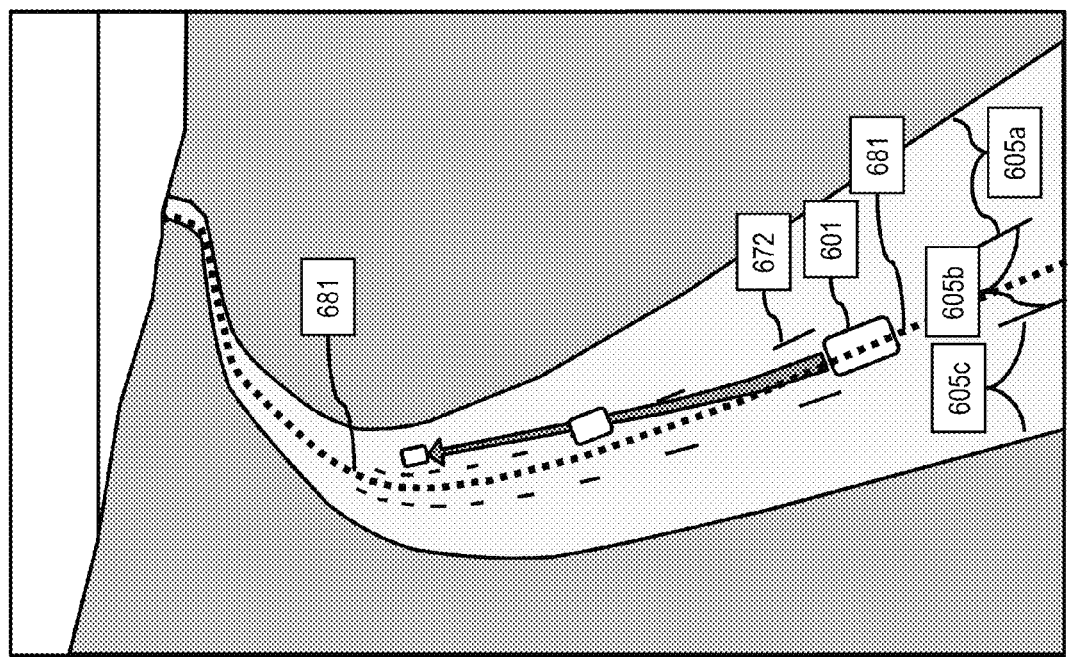

FIG. 6G shows diagram 670 where the vehicle 601 makes a lane change from 605b to 605a where the processing platform 103 may determine the location trace data for the lane marking 671 (e.g., paint stripe between lanes 605a and 605b) where after the lane change into the lane 605a, the lane marking 671 would become the left lane marking 672 for the 605a lane. In one scenario, since the GPS/IMU points are not explicitly used, but are derived lane marking coordinates then no location trace data points may need to be excluded during the lane transition since the LDWS algorithm is capable of determining lane geometry coordinates even during lane transitions. In diagram 680 of FIG. 6H, the processing platform 103 can determine that there are three lanes (605a, 605b, 605c) on the road and it may further offset the lane marking 672 coordinates half a lane width to the left to align it with the road center 681. In one embodiment, a curve fitting algorithm may fit an analytic (spline) curve to the derived road center coordinates 681, where although there may be no gaps to interpolate, it may be advantageous to use Calculus of Variation (such as curvature preserving regularization) to stabilize the solution for optimum shape control and quality.

It is noted, that the methods described herein may significantly improve the quality of, for example, 2D ADAS spline shape with broad impact as it may be applied to current location databases as well as to archived ADAS GPS/IMU imaging data for increased efficiency and availability of data in the ADAS marketplace.

The processes described herein to accurately and efficiently process imaging data associated with location trace data of one or more links of a road may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 7:
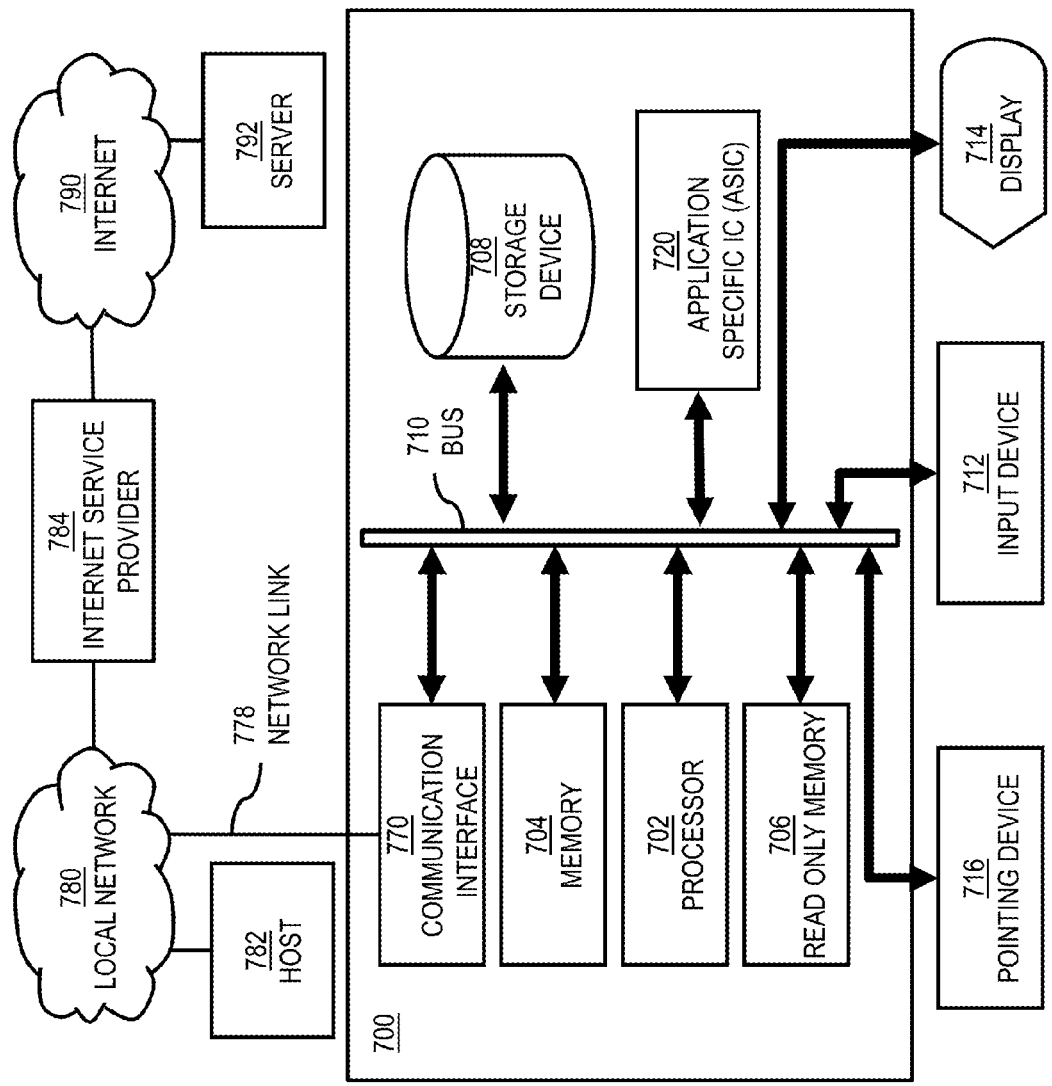
FIG. 7 is a diagram of hardware that can be used to implement an embodiment of the invention.

FIG. 7 illustrates a computer system 700 upon which an embodiment of the invention may be implemented. Although computer system 700 is depicted with respect to a particular device or equipment, it is contemplated that other devices or equipment (e.g., network elements, servers, etc.) within FIG. 7 can deploy the illustrated hardware and components of system 700. Computer system 700 is programmed (e.g., via computer program code or instructions) to accurately and efficiently process imaging data associated with location trace data of one or more links of a road as described herein and includes a communication mechanism such as a bus 710 for passing information between other internal and external components of the computer system 700. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 700, or a portion thereof, constitutes a means for performing one or more steps to accurately and efficiently process imaging data associated with location trace data of one or more links of a road.

A bus 710 includes one or more parallel conductors of information so that information is transferred quickly among devices coupled to the bus 710. One or more processors 702 for processing information are coupled with the bus 710.

A processor (or multiple processors) 702 performs a set of operations on information as specified by computer program code related to accurately and efficiently process imaging data associated with location trace data of one or more links of a road. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 710 and placing information on the bus 710. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 702, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 700 also includes a memory 704 coupled to bus 710. The memory 704, such as a random access memory (RAM) or any other dynamic storage device, stores information including processor instructions to accurately and efficiently process imaging data associated with location trace data of one or more links of a road. Dynamic memory allows information stored therein to be changed by the computer system 700. RAM allows a unit of information stored at a location called a memory address to be stored and retrieved independently of information at neighboring addresses. The memory 704 is also used by the processor 702 to store temporary values during execution of processor instructions. The computer system 700 also includes a read only memory (ROM) 706 or any other static storage device coupled to the bus 710 for storing static information, including instructions, that is not changed by the computer system 700. Some memory is composed of volatile storage that loses the information stored thereon when power is lost. Also coupled to bus 710 is a non-volatile (persistent) storage device 708, such as a magnetic disk, optical disk or flash card, for storing information, including instructions, that persists even when the computer system 700 is turned off or otherwise loses power.

Information, including instructions to accurately and efficiently process imaging data associated with location trace data of one or more links of a road, is provided to the bus 710 for use by the processor from an external input device 712, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 700. Other external devices coupled to bus 710, used primarily for interacting with humans, include a display device 714, such as a cathode ray tube (CRT), a liquid crystal display (LCD), a light emitting diode (LED) display, an organic LED (OLED) display, a plasma screen, or a printer for presenting text or images, and a pointing device 716, such as a mouse, a trackball, cursor direction keys, or a motion sensor, for controlling a position of a small cursor image presented on the display 714 and issuing commands associated with graphical elements presented on the display 714. In some embodiments, for example, in embodiments in which the computer system 700 performs all functions automatically without human input, one or more of external input device 712, display device 714 and pointing device 716 is omitted.

In the illustrated embodiment, special purpose hardware, such as an application specific integrated circuit (ASIC) 720, is coupled to bus 710. The special purpose hardware is configured to perform operations not performed by processor 702 quickly enough for special purposes. Examples of ASICs include graphics accelerator cards for generating images for display 714, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 700 also includes one or more instances of a communications interface 770 coupled to bus 710. Communication interface 770 provides a one-way or two-way communication coupling to a variety of external devices that operate with their own processors, such as printers, scanners and external disks. In general the coupling is with a network link 778 that is connected to a local network 780 to which a variety of external devices with their own processors are connected. For example, communication interface 770 may be a parallel port or a serial port or a universal serial bus (USB) port on a personal computer. In some embodiments, communications interface 770 is an integrated services digital network (ISDN) card or a digital subscriber line (DSL) card or a telephone modem that provides an information communication connection to a corresponding type of telephone line. In some embodiments, a communication interface 770 is a cable modem that converts signals on bus 710 into signals for a communication connection over a coaxial cable or into optical signals for a communication connection over a fiber optic cable. As another example, communications interface 770 may be a local area network (LAN) card to provide a data communication connection to a compatible LAN, such as Ethernet. Wireless links may also be implemented. For wireless links, the communications interface 770 sends or receives or both sends and receives electrical, acoustic or electromagnetic signals, including infrared and optical signals, that carry information streams, such as digital data. For example, in wireless handheld devices, such as mobile telephones like cell phones, the communications interface 770 includes a radio band electromagnetic transmitter and receiver called a radio transceiver. In certain embodiments, the communications interface 770 enables connection to the communication network 105 to accurately and efficiently process imaging data associated with location trace data of one or more links of a road to the UEs 101.

The term "computer-readable medium" as used herein refers to any medium that participates in providing information to processor 702, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 708. Volatile media include, for example, dynamic memory 704. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 720.

Network link 778 typically provides information communication using transmission media through one or more networks to other devices that use or process the information. For example, network link 778 may provide a connection through local network 780 to a host computer 782 or to equipment 784 operated by an Internet Service Provider (ISP). ISP equipment 784 in turn provides data communication services through the public, world-wide packet-switching communication network of networks now commonly referred to as the Internet 790.

A computer called a server host 792 connected to the Internet hosts a process that provides a service in response to information received over the Internet. For example, server host 792 hosts a process that provides information representing video data for presentation at display 714. It is contemplated that the components of system 700 can be deployed in various configurations within other computer systems, e.g., host 782 and server 792.

At least some embodiments of the invention are related to the use of computer system 700 for implementing some or all of the techniques described herein. According to one embodiment of the invention, those techniques are performed by computer system 700 in response to processor 702 executing one or more sequences of one or more processor instructions contained in memory 704. Such instructions, also called computer instructions, software and program code, may be read into memory 704 from another computer-readable medium such as storage device 708 or network link 778. Execution of the sequences of instructions contained in memory 704 causes processor 702 to perform one or more of the method steps described herein. In alternative embodiments, hardware, such as ASIC 720, may be used in place of or in combination with software to implement the invention. Thus, embodiments of the invention are not limited to any specific combination of hardware and software, unless otherwise explicitly stated herein.

The signals transmitted over network link 778 and other networks through communications interface 770, carry information to and from computer system 700. Computer system 700 can send and receive information, including program code, through the networks 780, 790 among others, through network link 778 and communications interface 770. In an example using the Internet 790, a server host 792 transmits program code for a particular application, requested by a message sent from computer 700, through Internet 790, ISP equipment 784, local network 780 and communications interface 770. The received code may be executed by processor 702 as it is received, or may be stored in memory 704 or in storage device 708 or any other non-volatile storage for later execution, or both. In this manner, computer system 700 may obtain application program code in the form of signals on a carrier wave.

Various forms of computer readable media may be involved in carrying one or more sequence of instructions or data or both to processor 702 for execution. For example, instructions and data may initially be carried on a magnetic disk of a remote computer such as host 782. The remote computer loads the instructions and data into its dynamic memory and sends the instructions and data over a telephone line using a modem. A modem local to the computer system 700 receives the instructions and data on a telephone line and uses an infra-red transmitter to convert the instructions and data to a signal on an infra-red carrier wave serving as the network link 778. An infrared detector serving as communications interface 770 receives the instructions and data carried in the infrared signal and places information representing the instructions and data onto bus 710. Bus 710 carries the information to memory 704 from which processor 702 retrieves and executes the instructions using some of the data sent with the instructions. The instructions and data received in memory 704 may optionally be stored on storage device 708, either before or after execution by the processor 702.

Figure 8:
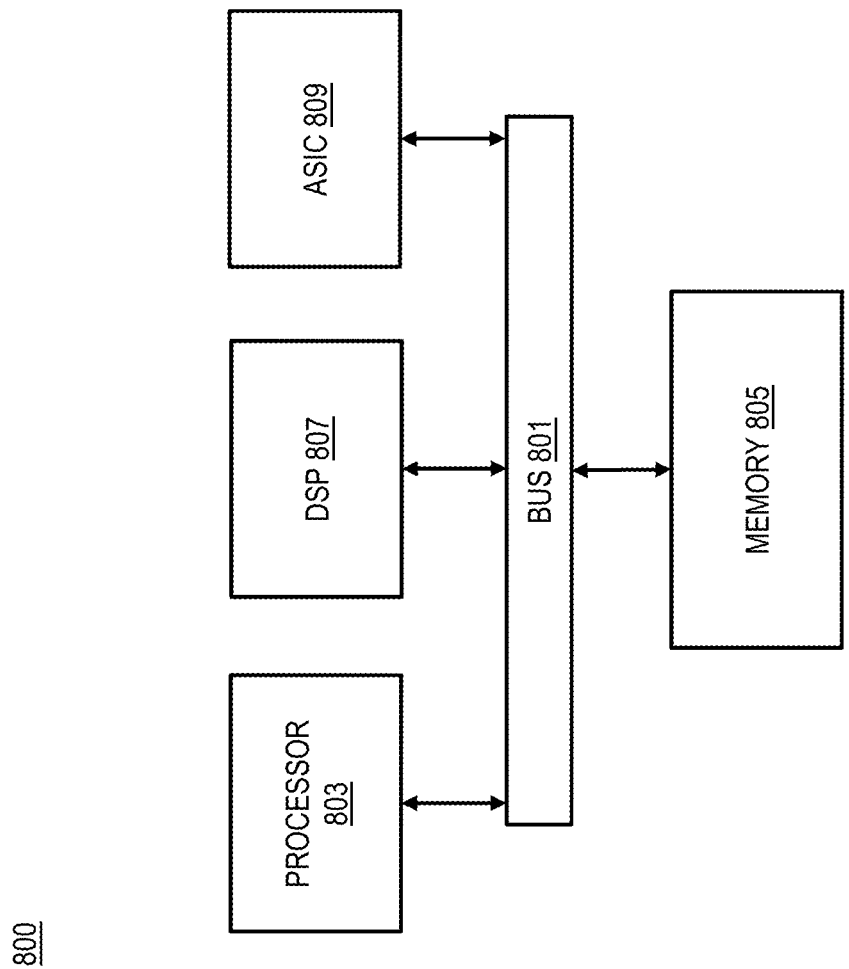
FIG. 8 is a diagram of a chip set that can be used to implement an embodiment of the invention.

FIG. 8 illustrates a chip set or chip 800 upon which an embodiment of the invention may be implemented. Chip set 800 is programmed to accurately and efficiently process imaging data associated with location trace data of one or more links of a road as described herein and includes, for instance, the processor and memory components described with respect to FIG. 7 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 800 can be implemented in a single chip. It is further contemplated that in certain embodiments the chip set or chip 800 can be implemented as a single "system on a chip." It is further contemplated that in certain embodiments a separate ASIC would not be used, for example, and that all relevant functions as disclosed herein would be performed by a processor or processors. Chip set or chip 800, or a portion thereof, constitutes a means for performing one or more steps of providing user interface navigation information associated with the availability of functions. Chip set or chip 800, or a portion thereof, constitutes a means for performing one or more steps to accurately and efficiently process imaging data associated with location trace data of one or more links of a road.

In one embodiment, the chip set or chip 800 includes a communication mechanism such as a bus 801 for passing information among the components of the chip set 800. A processor 803 has connectivity to the bus 801 to execute instructions and process information stored in, for example, a memory 805. The processor 803 may include one or more processing cores with each core configured to perform independently. A multi-core processor enables multiprocessing within a single physical package. Examples of a multi-core processor include two, four, eight, or greater numbers of processing cores. Alternatively or in addition, the processor 803 may include one or more microprocessors configured in tandem via the bus 801 to enable independent execution of instructions, pipelining, and multithreading. The processor 803 may also be accompanied with one or more specialized components to perform certain processing functions and tasks such as one or more digital signal processors (DSP) 807, or one or more application-specific integrated circuits (ASIC) 809. A DSP 807 typically is configured to process real-world signals (e.g., sound) in real time independently of the processor 803. Similarly, an ASIC 809 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 800 includes merely one or more processors and some software and/or firmware supporting and/or relating to and/or for the one or more processors.

The processor 803 and accompanying components have connectivity to the memory 805 via the bus 801. The memory 805 includes both dynamic memory (e.g., RAM, magnetic disk, writable optical disk, etc.) and static memory (e.g., ROM, CD-ROM, etc.) for storing executable instructions that when executed perform the inventive steps described herein to accurately and efficiently process imaging data associated with location trace data of one or more links of a road. The memory 805 also stores the data associated with or generated by the execution of the inventive steps.

Figure 9:
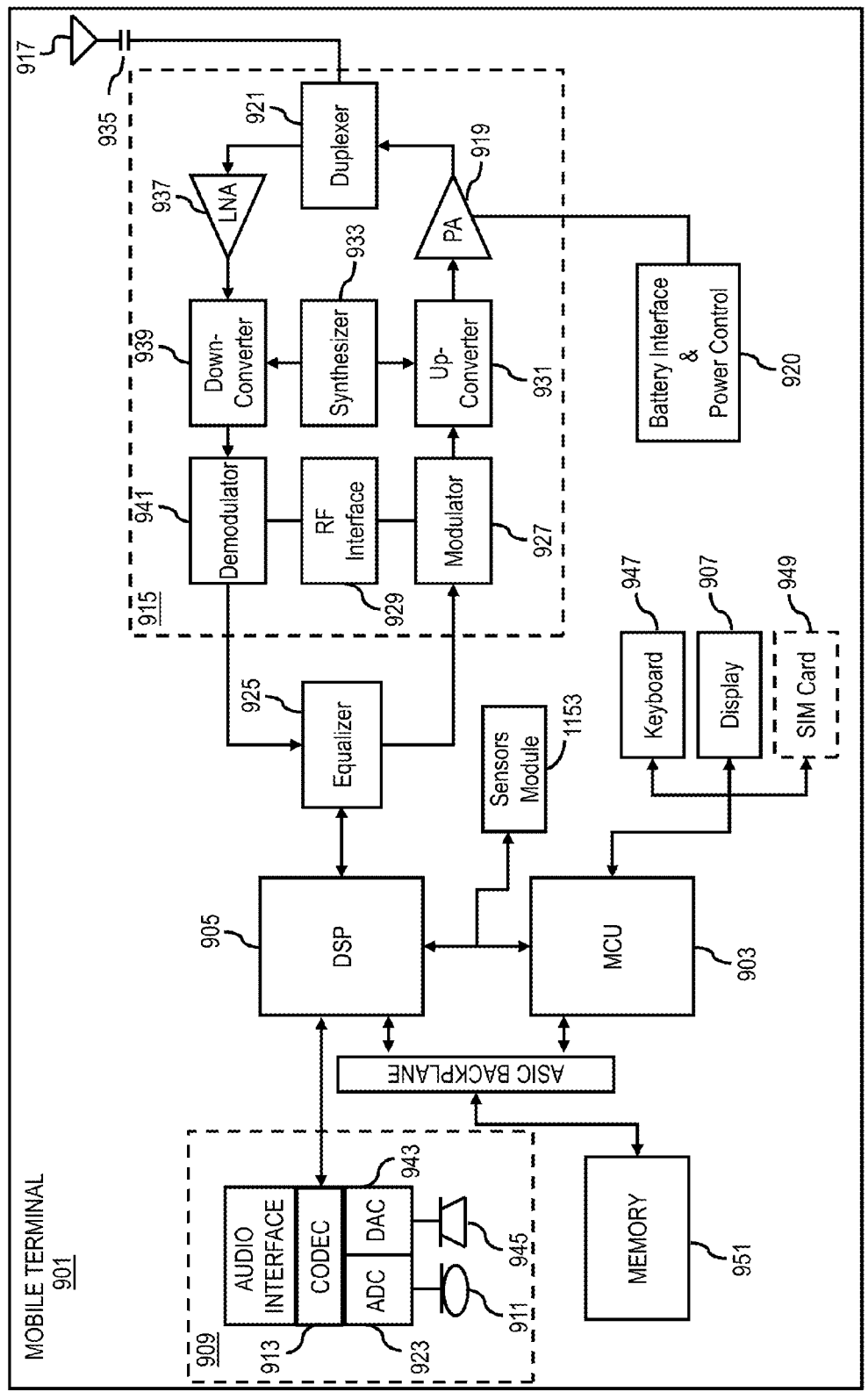
FIG. 9 is a diagram of a mobile terminal (e.g., handset) that can be used to implement an embodiment of the invention.

FIG. 9 is a diagram of exemplary components of a mobile terminal (e.g., handset) for communications, which is capable of operating in the system of FIG. 1, according to one embodiment. In some embodiments, mobile terminal 901, or a portion thereof, constitutes a means for performing one or more steps to accurately and efficiently process imaging data associated with location trace data of one or more links of a road. Generally, a radio receiver is often defined in terms of front-end and back-end characteristics. The front-end of the receiver encompasses all of the Radio Frequency (RF) circuitry whereas the back-end encompasses all of the baseband processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 903, a Digital Signal Processor (DSP) 905, and a receiver/transmitter unit including a microphone gain control unit and a speaker gain control unit. A main display unit 907 provides a display to the user in support of various applications and mobile terminal functions that perform or support the steps to accurately and efficiently process imaging data associated with location trace data of one or more links of a road. The display 907 includes display circuitry configured to display at least a portion of a user interface of the mobile terminal (e.g., mobile telephone). Additionally, the display 907 and display circuitry are configured to facilitate user control of at least some functions of the mobile terminal. An audio function circuitry 909 includes a microphone 911 and microphone amplifier that amplifies the speech signal output from the microphone 911. The amplified speech signal output from the microphone 911 is fed to a coder/decoder (CODEC) 913.

A radio section 915 amplifies power and converts frequency in order to communicate with a base station, which is included in a mobile communication system, via antenna 917. The power amplifier (PA) 919 and the transmitter/modulation circuitry are operationally responsive to the MCU 903, with an output from the PA 919 coupled to the duplexer 921 or circulator or antenna switch, as known in the art. The PA 919 also couples to a battery interface and power control unit 920.

In use, a user of mobile terminal 901 speaks into the microphone 911 and his or her voice along with any detected background noise is converted into an analog voltage. The analog voltage is then converted into a digital signal through the Analog to Digital Converter (ADC) 923. The control unit 903 routes the digital signal into the DSP 905 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 925 for compensation of any frequency-dependent impairments that occur during transmission though the air such as phase and amplitude distortion. After equalizing the bit stream, the modulator 927 combines the signal with a RF signal generated in the RF interface 929. The modulator 927 generates a sine wave by way of frequency or phase modulation. In order to prepare the signal for transmission, an up-converter 931 combines the sine wave output from the modulator 927 with another sine wave generated by a synthesizer 933 to achieve the desired frequency of transmission. The signal is then sent through a PA 919 to increase the signal to an appropriate power level. In practical systems, the PA 919 acts as a variable gain amplifier whose gain is controlled by the DSP 905 from information received from a network base station. The signal is then filtered within the duplexer 921 and optionally sent to an antenna coupler 935 to match impedances to provide maximum power transfer. Finally, the signal is transmitted via antenna 917 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 901 are received via antenna 917 and immediately amplified by a low noise amplifier (LNA) 937. A down-converter 939 lowers the carrier frequency while the demodulator 941 strips away the RF leaving only a digital bit stream. The signal then goes through the equalizer 925 and is processed by the DSP 905. A Digital to Analog Converter (DAC) 943 converts the signal and the resulting output is transmitted to the user through the speaker 945, all under control of a Main Control Unit (MCU) 903 which can be implemented as a Central Processing Unit (CPU).

The MCU 903 receives various signals including input signals from the keyboard 947. The keyboard 947 and/or the MCU 903 in combination with other user input components (e.g., the microphone 911) comprise a user interface circuitry for managing user input. The MCU 903 runs a user interface software to facilitate user control of at least some functions of the mobile terminal 901 to accurately and efficiently process imaging data associated with location trace data of one or more links of a road. The MCU 903 also delivers a display command and a switch command to the display 907 and to the speech output switching controller, respectively. Further, the MCU 903 exchanges information with the DSP 905 and can access an optionally incorporated SIM card 949 and a memory 951. In addition, the MCU 903 executes various control functions required of the terminal. The DSP 905 may, depending upon the implementation, perform any of a variety of conventional digital processing functions on the voice signals. Additionally, DSP 905 determines the background noise level of the local environment from the signals detected by microphone 911 and sets the gain of microphone 911 to a level selected to compensate for the natural tendency of the user of the mobile terminal 901.

The CODEC 913 includes the ADC 923 and DAC 943. The memory 951 stores various data including call incoming tone data and is capable of storing other data including music data received via, e.g., the global Internet. The software module could reside in RAM memory, flash memory, registers, or any other form of writable storage medium known in the art. The memory device 951 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 949 carries, for instance, important information, such as the cellular phone number, the carrier supplying service, subscription details, and security information. The SIM card 949 serves primarily to identify the mobile terminal 901 on a radio network. The card 949 also contains a memory for storing a personal telephone number registry, text messages, and user specific mobile terminal settings.

Additionally, sensors module 953 may include various sensors, for instance, a location sensor, a speed sensor, an audio sensor, an image sensor, a brightness sensor, a biometrics sensor, various physiological sensors, a directional sensor, and the like, for capturing various data associated with the mobile terminal 901 (e.g., a mobile phone), a user of the mobile terminal 901, an environment of the mobile terminal 901 and/or the user, or a combination thereof, wherein the data may be collected, processed, stored, and/or shared with one or more components and/or modules of the mobile terminal 901 and/or with one or more entities external to the mobile terminal 901.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising processing, via a processor, (1) data, (2) information, or (3) at least one signal, the (1) data, (2) information, or (3) at least one signal based, at least in part, on the following:
   a processing, via the processor, of imaging data associated with location trace data of at least one link of a road to determine maneuvering information for at least one vehicle collecting the imaging data, the location trace data, or a combination thereof;
   at least one determination, via the processor, of whether to cause, at least in part, an adjusting of at least a portion of the location trace data based, at least in part, on the maneuvering information; and
   at least one determination of the maneuvering information with respect to a centerline, one or more lane markings, one or more boundaries, or a combination thereof of the at least one link of the road,
   wherein the imaging data comprises a plurality of video frames, and
   wherein a particular location trace associated with the location trace data is indexed with one of the plurality of video frames corresponding to the particular location trace.

2. A method of claim 1, wherein the (1) data, (2) information, or (3) at least one signal are further based, at least in part, on the following:
   at least one determination of location information of the centerline, the one or more lane markings, the one or more boundaries, or a combination thereof based, at least in part, on the imaging data, the location trace data, or a combination thereof.

3. A method of claim 1, wherein the maneuvering information indicates, at least in part, a lane departure maneuver, a ramp exit maneuver, an overtaking maneuver, an obstacle avoidance maneuver, a route departure maneuver, or a combination thereof associated with the at least one vehicle while traveling the at least one link of the road.

4. A method of claim 1, wherein the (1) data, (2) information, or (3) at least one signal are further based, at least in part, on the following:
   at least one determination that the maneuvering information indicates, at least in part, a movement of the at least one vehicle above a threshold value,
   wherein the adjusting includes, at least in part, a removal of the at least a portion of the location trace data collected at least concurrently with the movement.

5. A method of claim 1, wherein the (1) data, (2) information, or (3) at least one signal are further based, at least in part, on the following:

at least one determination that the maneuvering information indicates, at least in part, a movement of the at least one vehicle above a threshold value; and
an offset to the location of the at least a portion of the location trace data based, at least in part, on the maneuvering information.

6. A method of claim 1, wherein the (1) data, (2) information, or (3) at least one signal are further based, at least in part, on the following:
a comparison of the imaging data with reference to the location trace data based, at least in part, on location information of one or more objects, one or more points of interest, or a combination thereof available in the imaging data.

7. A method of claim 6, wherein the (1) data, (2) information, or (3) at least one signal are further based, at least in part, on the following:
at least one determination of whether a result of the comparison is above a deviation threshold value;
a synchronization of the imaging data and the associated location trace data based, at least in part, on the deviation; and
a recalculation of the offset based, at least in part, on the synchronized imaging data and the associated location trace data.

8. A method of claim 1, wherein the (1) data, (2) information, or (3) at least one signal are further based, at least in part, on the following:
at least one determination that the maneuvering information indicates, at least in part, a movement of the at least one vehicle below a threshold value; and
a validation of the at least a portion of the location trace data collected at least concurrently with the movement.

9. A method of claim 1, wherein the processing of the imaging data is performed as a batch process, a streaming process, or a combination thereof.

10. An apparatus comprising:
at least one processor; and
at least one memory including computer program code for one or more programs,
the at least one memory and the computer program code configured to, with the at least one processor, cause the apparatus to perform at least the following:
process and/or facilitate a processing of imaging data associated with location trace data of at least one link of a road to determine maneuvering information for at least one vehicle collecting the imaging data, the location trace data, or a combination thereof;
determine whether to cause, at least in part, an adjusting of at least a portion of the location trace data based, at least in part, on the maneuvering information; and
determine the maneuvering information with respect to a centerline, one or more lane markings, one or more boundaries, or a combination thereof of the at least one link of the road,
wherein the imaging data comprises a plurality of video frames, and
wherein a particular location trace associated with the location trace data is indexed with one of the plurality of video frames corresponding to the particular location trace.

11. An apparatus of claim 10, wherein the apparatus is further caused to:
determine location information of the centerline, the one or more lane markings, the one or more boundaries, or a combination thereof based, at least in part, on the imaging data, the location trace data, or a combination thereof.

12. An apparatus of claim 10, wherein the maneuvering information indicates, at least in part, a lane departure maneuver, a ramp exit maneuver, an overtaking maneuver, an obstacle avoidance maneuver, a route departure maneuver, or a combination thereof associated with the at least one vehicle while traveling the at least one link of the road.

13. An apparatus of claim 10, wherein the apparatus is further caused to:
determine that the maneuvering information indicates, at least in part, a movement of the at least one vehicle above a threshold value,
wherein the adjusting includes, at least in part, a removal of the at least a portion of the location trace data collected at least concurrently with the movement.

14. An apparatus of claim 10, wherein the apparatus is further caused to:
determine that the maneuvering information indicates, at least in part, a movement of the at least one vehicle above a threshold value; and
cause, at least in part, an offset to the location of the at least a portion of the location trace data based, at least in part, on the maneuvering information.

15. An apparatus of claim 10, wherein the apparatus is further caused to:
cause, at least in part, a comparison of the imaging data with reference to the location trace data based, at least in part, on location information of one or more objects, one or more points of interest, or a combination thereof available in the imaging data.

16. An apparatus of claim 15, wherein the apparatus is further caused to:
determine whether a result of the comparison is above a deviation threshold value;
cause, at least in part, a synchronization of the imaging data and the associated location trace data based, at least in part, on the deviation; and
cause, at least in part, a recalculation of the offset based, at least in part, on the synchronized imaging data and the associated location trace data.

17. An apparatus of claim 10, wherein the apparatus is further caused to:
determine that the maneuvering information indicates, at least in part, a movement of the at least one vehicle below a threshold value; and
cause, at least in part, a validation of the at least a portion of the location trace data collected at least concurrently with the movement.

18. An apparatus of claim 10, wherein the processing of the imaging data is performed as a batch process, a streaming process, or a combination thereof.

* * * * *